(12) United States Patent
Fujisawa et al.

(10) Patent No.: US 8,637,589 B2
(45) Date of Patent: *Jan. 28, 2014

(54) SILICONE PREPOLYMER SOLUTIONS

(75) Inventors: Kazuhiko Fujisawa, Shiga (JP); Mitsuru Yokota, Shiga (JP); Masataka Nakamura, Shiga (JP)

(73) Assignees: Johnson & Johnson Vision Care, Inc., Jacksonville, FL (US); Toray Industries, Tokyo (JP)

( * ) Notice: Subject to any disclaimer, the term of this patent is extended or adjusted under 35 U.S.C. 154(b) by 414 days.

This patent is subject to a terminal disclaimer.

(21) Appl. No.: 12/962,575

(22) Filed: Dec. 7, 2010

(65) Prior Publication Data

US 2011/0077322 A1     Mar. 31, 2011

Related U.S. Application Data

(63) Continuation of application No. 12/060,536, filed on Apr. 1, 2008, now Pat. No. 7,897,654.

(60) Provisional application No. 61/017,158, filed on Dec. 27, 2007.

(51) Int. Cl.
*G02B 1/04* (2006.01)

(52) U.S. Cl.
USPC ........ 523/107; 524/755; 524/762; 525/326.5; 525/326.7; 525/326.8; 525/326.9; 526/279; 526/303.1; 526/320

(58) Field of Classification Search
None
See application file for complete search history.

(56) References Cited

U.S. PATENT DOCUMENTS

| | | | |
|---|---|---|---|
| 2,793,223 A | 5/1957 | Merker |
| 2,956,044 A | 10/1960 | Merker |
| 3,001,975 A | 9/1961 | O'Brien |
| 3,057,902 A | 10/1962 | Pike |
| 3,377,371 A | 4/1968 | Quaal |
| 3,563,742 A | 2/1971 | Kempen |
| 3,699,081 A | 10/1972 | Iwashita |
| 3,756,820 A | 9/1973 | Hayakawa et al. |
| 3,808,178 A | 4/1974 | Gaylord |
| 3,859,320 A | 1/1975 | Atherton |
| 3,865,588 A | 2/1975 | Ohto et al. |
| 3,959,358 A | 5/1976 | Jursich |
| 4,117,001 A | 9/1978 | Fozzard |
| 4,120,570 A | 10/1978 | Gaylord |
| 4,139,513 A | 2/1979 | Tanaka et al. |
| 4,139,692 A | 2/1979 | Tanaka et al. |
| 4,144,137 A | 3/1979 | Stewart |
| 4,235,985 A | 11/1980 | Tanaka et al. |
| 4,246,389 A | 1/1981 | LeBoeuf |
| 4,259,467 A | 3/1981 | Keogh et al. |
| 4,260,725 A | 4/1981 | Keogh et al. |
| 4,321,029 A | 3/1982 | Aoki |
| 4,395,496 A | 7/1983 | Wittmann et al. |
| 4,402,887 A | 9/1983 | Kuriyama et al. |
| 4,463,149 A | 7/1984 | Ellis |
| 4,563,538 A | 1/1986 | Wakabayashi et al. |
| 4,602,074 A | 7/1986 | Mizutani et al. |
| 4,632,968 A | 12/1986 | Yokota et al. |
| 4,853,453 A | 8/1989 | Schafer et al. |
| 4,861,850 A | 8/1989 | Novicky |
| 5,010,141 A | 4/1991 | Mueller |
| 5,045,233 A | 9/1991 | Kita et al. |
| 5,045,621 A | 9/1991 | Suzuki |
| 5,057,578 A | 10/1991 | Spinelli |
| 5,079,319 A | 1/1992 | Mueller |
| 5,128,484 A | 7/1992 | Kita et al. |
| 5,219,965 A | 6/1993 | Valint, Jr. et al. |
| 5,244,981 A | 9/1993 | Seidner et al. |
| 5,314,960 A | 5/1994 | Spinelli et al. |
| 5,321,108 A | 6/1994 | Kunzler et al. |
| 5,329,034 A | 7/1994 | Nagase et al. |
| 5,336,797 A | 8/1994 | McGee et al. |
| 5,356,947 A | 10/1994 | Ali et al. |
| 5,371,147 A | 12/1994 | Spinelli et al. |
| 5,387,662 A | 2/1995 | Kunzler et al. |
| 5,387,663 A | 2/1995 | McGee et al. |
| 5,470,930 A | 11/1995 | Toba et al. |
| 5,481,015 A | 1/1996 | Nomura |
| 5,493,039 A | 2/1996 | Okawa et al. |

(Continued)

FOREIGN PATENT DOCUMENTS

BR    7403534      4/1974
EP    0300620 A1   1/1989

(Continued)

OTHER PUBLICATIONS

Issue Notification issued on Feb. 9, 2011 for U.S. Appl. No. 12/060,536, filed Apr. 1, 2008 (Applicant—Vistakon; Inventors—Fujisawa, et al.; (1 page).
Response to Amendment issued on Jan. 14, 2011 for U.S. Appl. No. 12/060,536, filed Apr. 1, 2008 (Applicant—Vistakon; Inventors—Fujisawa, et al.; (2 pages).
Amendment after Notice of Allowance filed on Dec. 1, 2010 for ; U.S. Appl. No. 12/060,536, filed Apr. 1, 2008 (Applicant—Vistakon; Inventors—Fujisawa, et al.; (2 pages).
Notice of Allowance for U.S. Appl. No. 12/060,536, filed Apr. 1, 2008 (Applicant—Vistakon; Inventors—Fujisawa, et al.; (7 pages).
Non-Final Rejection issued on Mar. 18, 2010 for U.S. Appl. No. 12/060,536, filed Apr. 1, 2008 (Applicant—Vistakon; Inventors—; Fujisawa, et al.; (8 pages).

(Continued)

*Primary Examiner* — Marc Zimmer
(74) *Attorney, Agent, or Firm* — Ballard Spahr LLP

(57) ABSTRACT

In one aspect, the invention relates to silicone prepolymer compositions comprising a silicone prepolymer and a solvent. A soluble silicone prepolymer can be provided having increased average silicon content, thereby attaining a desired oxygen permeability. A solvent can be provided with a desired balance between hydrophilicity and hydrophobicity by selection and modification of the solvent molecular structure, resulting in molded polymer films and articles that exhibit minimal or nonexistent eye irritation and exhibit highly transparent products. This abstract is intended as a scanning tool for purposes of searching in the particular art and is not intended to be limiting of the present invention.

30 Claims, 2 Drawing Sheets

(56) References Cited

U.S. PATENT DOCUMENTS

| | | | |
|---|---|---|---|
| 5,539,016 A | 7/1996 | Kunzler et al. | |
| 5,554,706 A | 9/1996 | Nagase et al. | |
| 5,563,184 A | 10/1996 | McGee et al. | |
| 5,610,252 A * | 3/1997 | Bambury et al. | 526/279 |
| 5,831,110 A | 11/1998 | Isoda et al. | |
| 5,888,356 A | 3/1999 | Keil et al. | |
| 5,891,977 A | 4/1999 | Dietz et al. | |
| 5,959,117 A | 9/1999 | Ozark et al. | |
| 5,962,548 A | 10/1999 | Vanderlaan et al. | |
| 5,994,488 A | 11/1999 | Yokota et al. | |
| 6,031,059 A | 2/2000 | Vanderlaan et al. | |
| 6,177,585 B1 | 1/2001 | Chen et al. | |
| 6,180,741 B1 | 1/2001 | Yamaguchi et al. | |
| 6,218,503 B1 | 4/2001 | Lai et al. | |
| 6,242,153 B1 | 6/2001 | Sato et al. | |
| 6,306,992 B1 | 10/2001 | Yoshitake et al. | |
| 6,334,935 B1 | 1/2002 | Uehara et al. | |
| 6,344,495 B1 | 2/2002 | Ueda et al. | |
| 6,350,816 B1 | 2/2002 | Farronato et al. | |
| 6,617,373 B2 | 9/2003 | Sulc et al. | |
| 6,649,722 B2 | 11/2003 | Rosenzweig et al. | |
| 6,783,897 B2 | 8/2004 | Kang et al. | |
| 6,787,615 B2 | 9/2004 | Keller et al. | |
| 6,803,406 B2 | 10/2004 | Musa | |
| 6,809,155 B2 | 10/2004 | Musa | |
| 6,818,719 B2 * | 11/2004 | Fujisawa et al. | 526/323.2 |
| 6,822,016 B2 | 11/2004 | McCabe et al. | |
| 6,846,892 B2 | 1/2005 | Kindt-Larsen et al. | |
| 6,908,969 B2 | 6/2005 | Musa | |
| 6,922,118 B2 | 7/2005 | Kubena et al. | |
| 6,933,401 B2 | 8/2005 | Molock et al. | |
| 7,169,874 B2 | 1/2007 | Salamone et al. | |
| RE39,635 E | 5/2007 | Vanderlaan et al. | |
| 7,317,117 B2 | 1/2008 | Nakamura et al. | |
| 7,368,589 B2 | 5/2008 | Mahadevan et al. | |
| 7,461,937 B2 | 12/2008 | Steffen et al. | |
| 7,683,206 B2 * | 3/2010 | Fujisawa et al. | 560/205 |
| 7,838,698 B2 | 11/2010 | Fujisawa et al. | |
| 7,868,112 B2 * | 1/2011 | Oikawa et al. | 526/279 |
| 7,897,654 B2 * | 3/2011 | Fujisawa et al. | 523/107 |
| 8,071,661 B2 * | 12/2011 | Lai et al. | 523/107 |
| 2002/0016383 A1 | 2/2002 | Iwata et al. | |
| 2003/0109661 A1 | 6/2003 | Salamone et al. | |
| 2003/0125498 A1 | 7/2003 | McCabe et al. | |
| 2003/0130465 A1 | 7/2003 | Lai et al. | |
| 2003/0203986 A1 | 10/2003 | Valet | |
| 2004/0014921 A1 | 1/2004 | Fujisawa et al. | |
| 2004/0106694 A1 | 6/2004 | Fujisawa et al. | |
| 2004/0114101 A1 | 6/2004 | Thakrar | |
| 2004/0122249 A1 | 6/2004 | Fujisawa et al. | |
| 2004/0198916 A1 | 10/2004 | Nakamura et al. | |
| 2004/0198938 A1 | 10/2004 | Nakamura et al. | |
| 2004/0201820 A1 | 10/2004 | Nakamura et al. | |
| 2004/0249180 A1 | 12/2004 | Nakamura et al. | |
| 2005/0165246 A1 | 7/2005 | Lai et al. | |
| 2005/0179862 A1 | 8/2005 | Steffen et al. | |
| 2005/0237483 A1 | 10/2005 | Phelan | |
| 2006/0007391 A1 * | 1/2006 | McCabe et al. | 351/160 H |
| 2006/0036052 A1 * | 2/2006 | Kindt-Larsen et al. | 526/320 |
| 2006/0047134 A1 | 3/2006 | Molock et al. | |
| 2006/0223964 A1 | 10/2006 | Lai et al. | |
| 2006/0229423 A1 | 10/2006 | Parakka et al. | |
| 2007/0138669 A1 | 6/2007 | Lai et al. | |
| 2007/0203275 A1 | 8/2007 | Kikuchi et al. | |
| 2007/0242219 A1 | 10/2007 | Zanini et al. | |
| 2008/0004383 A1 | 1/2008 | Nakamura et al. | |
| 2008/0004401 A1 | 1/2008 | Nakamura et al. | |
| 2008/0081850 A1 | 4/2008 | Fujisawa et al. | |
| 2008/0081894 A1 | 4/2008 | Fujisawa et al. | |
| 2008/0119627 A1 | 5/2008 | Nakamura et al. | |
| 2008/0143003 A1 | 6/2008 | Phelan | |
| 2008/0231798 A1 | 9/2008 | Zhou et al. | |
| 2009/0005528 A1 | 1/2009 | Fujisawa et al. | |
| 2009/0156708 A1 | 6/2009 | Lai et al. | |
| 2010/0041822 A1 | 2/2010 | Hashemzadeh | |
| 2011/0028673 A1 | 2/2011 | Fujisawa et al. | |

FOREIGN PATENT DOCUMENTS

| | | |
|---|---|---|
| EP | 0306756 A2 | 3/1989 |
| EP | 0639576 A1 | 2/1995 |
| EP | 0 733 637 A1 | 9/1996 |
| EP | 0 753 521 | 1/1997 |
| EP | 0 965 593 | 12/1999 |
| EP | 1123915 A1 | 8/2001 |
| EP | 1 386 924 A1 | 2/2004 |
| EP | 1 403 396 A1 | 3/2004 |
| EP | 1 426 809 A1 | 6/2004 |
| EP | 1424088 A1 | 6/2004 |
| EP | 1424339 A1 | 6/2004 |
| EP | 1 719 776 A1 | 11/2006 |
| EP | 1 749 812 A1 | 2/2007 |
| GB | 1274382 A | 5/1972 |
| GB | 1 364 360 A | 8/1974 |
| JP | 50-014786 B | 5/1975 |
| JP | 52-168545 U | 12/1977 |
| JP | 55-015110 A | 2/1980 |
| JP | 63216044 A | 9/1988 |
| JP | 63-301919 A | 12/1988 |
| JP | 04-077489 A | 3/1992 |
| JP | 06-032791 A | 2/1994 |
| JP | 08-283342 A | 10/1996 |
| JP | 56-22325 | 4/1997 |
| JP | 2000191667 A | 7/2000 |
| JP | 2000191730 A | 7/2000 |
| JP | 2001048939 A | 2/2001 |
| JP | 2004115790 A | 4/2004 |
| JP | 2006036757 A | 2/2006 |
| WO | WO-96/31792 A1 | 10/1996 |
| WO | WO-01/71392 A1 | 9/2001 |
| WO | WO-02/081532 A1 | 10/2002 |
| WO | WO-03/014130 A1 | 2/2003 |
| WO | WO-03/021336 A1 | 3/2003 |
| WO | WO-03/022322 A2 | 3/2003 |
| WO | WO-03/026541 A1 | 4/2003 |
| WO | WO-03/027123 A1 | 4/2003 |
| WO | WO-03/040193 A2 | 5/2003 |
| WO | WO-03/043668 A2 | 5/2003 |
| WO | WO-03/066688 A1 | 8/2003 |
| WO | WO-03/077792 A2 | 9/2003 |
| WO | WO-2005/005368 A1 | 1/2005 |
| WO | WO-2005/005445 A1 | 1/2005 |
| WO | WO-2005/044829 A1 | 5/2005 |
| WO | WO 2005/090364 * | 9/2005 |
| WO | WO-2005/090364 A1 | 9/2005 |
| WO | WO-2005/115958 A1 | 12/2005 |
| WO | WO-2007/146137 A2 | 12/2007 |
| WO | WO-2008/005398 A2 | 1/2008 |
| WO | WO-2008/066758 A1 | 6/2008 |
| WO | WO-2009/006285 A1 | 1/2009 |

OTHER PUBLICATIONS

Issue Notification issued on Feb. 27, 2013 for U.S. Appl. No. 13/300,576, filed Nov. 19, 2011 (Applicant—Vistakon; Inventors—; Fujisawa, et al.; (1 page).

Notice of Allowance issued on Nov. 5, 2012 for U.S. Appl. No. 13/300,576, filed Nov. 19, 2011 (Applicant—Vistakon; Inventors—; Fujisawa, et al.; (7 pages).

Supplemental Response to Office Action filed on Oct. 15, 2012 for U.S. Appl. No. 13/300,576, filed Nov. 19, 2011 (Applicant—Vistakon; Inventors—Fujisawa, et al.; (8pages).

Response to Office Action filed on Sep. 5, 2012 for U.S. Appl. No. 13/300,576, filed Nov. 19, 2011 (Applicant—Vistakon; Inventors—Fujisawa, et al.; (11 pages).

Non-Final Rejection issued on Mar. 5, 2012 for U.S. Appl. No. 13/300,576, filed Nov. 19, 2011 (Applicant—Vistakon; Inventors—; Fujisawa, et al.; (8 pages).

Issue Notification issued on Nov. 30, 2011 for U.S. Appl. No. 11/771,999, filed Jun. 9, 2007 (Applicant—Vistakon; Inventors—Fujisawa, et al.; (1 page).

(56) References Cited

OTHER PUBLICATIONS

Notice of Allowance issued on Oct. 13, 2011 for U.S. Appl. No. 11/771,999, filed Jun. 9, 2007 (Applicant—Vistakon; Inventors—Fujisawa, et al.; (2 pages).
Amendment after Notice of Allowance filed on Sep. 22, 2011 for U.S. Appl. No. 11/771,999, filed Jun. 9, 2007 (Applicant—Vistakon; Inventors—Fujisawa, et al.; (2 pages).
Notice of Allowance issued on Aug. 19, 2011 for U.S. Appl. No. 11/771,999, filed Jun. 9, 2007 (Applicant—Vistakon; Inventors—Fujisawa, et al.; (5 pages).
Response after Final Office Action filed on Aug. 11, 2011 for U.S. Appl. No. 11/771,999, filed Jun. 9, 2007 (Applicant—Vistakon; Inventors—Fujisawa, et al.; (10 pages).
Final Rejection issued on Apr. 1, 2011 for U.S. Appl. No. 11/771,999, filed Jun. 9, 2007 (Applicant—Vistakon; Inventors—Fujisawa, et al.; (9 pages).
Amendment and Response to Office Action filed on Mar. 15, 2011 for U.S. Appl. No. 11/771,999, filed Jun. 9, 2007 (Applicant—Vistakon; Inventors—Fujisawa, et al., (22 pages).
Non-Final Rejection issued on Oct. 15, 2010 for U.S. Appl. No. 11/771,999, filed Jun. 9, 2007 (Applicant—Vistakon; Inventors—Fujisawa, et al.; (10 pages).
Request for Continued Examination filed on Sep. 22, 2010 for U.S. Appl. No. 11/771,999, filed Jun. 9, 2007 (Applicant—Vistakon; Inventors—Fujisawa, et al.; (18 pages).
Final Rejection issued on Mar. 24, 2010 for U.S. Appl. No. 11/771,999, filed Jun. 9, 2007 (Applicant—Vistakon; Inventors—Fujisawa, et al.; (14 pages).
Non-Final Rejection issued on Jul. 31, 2009 for U.S. Appl. No. 11/771,999, filed Jun. 9, 2007 (Applicant—Vistakon; Inventors—Fujisawa, et al.; (17 pages).
Examiner Interview Summary Record (PTOL—413) issued on Jun. 29, 2009 for U.S. Appl. No. 11/771,999, filed Jun. 9, 2007 (Applicant—Vistakon; Inventors—Fujisawa, et al.; (4 pages).
Response to Office Action filed on Jun. 12, 2009 for U.S. Appl. No. 11/771,999, filed Jun. 9, 2007 (Applicant—Vistakon; Inventors—Fujisawa, et al.; (15 pages).
Non-Final Rejection issued on Feb. 10, 2009 for U.S. Appl. No. 11/771,999, filed Jun. 9, 2007 (Applicant—Vistakon; Inventors—Fujisawa, et al.; (12 pages).
Non-Final Rejection issued on Feb. 4, 2010 for U.S. Appl. No. 11/681,406, filed Mar. 2, 2007 (Applicant—Vistakon; Inventors—; Nakamura, et al. (9 pages).
Request for Continued Examination filed on Jan. 6, 2010 for for U.S. Appl. No. 11/681,406, filed Mar. 2, 2007 (Applicant—Vistakon; Inventors—Nakamura, et al.; (17 pages).
Examiner Interview Summary Record (PTOL—413) issued on Jul. 6, 2009 for U.S. Appl. No. 11/681,406, filed Mar. 2, 2007 (Applicant—Vistakon; Inventors—Nakamura, et al.; (3 pages).
Final Rejection issued on Jul. 6, 2009 for U.S. Appl. No. 11/681,406, filed Mar. 2, 2007 (Applicant—Vistakon; Inventors—; Nakamura, et al.; (10 pages).
Response to Office Action filed on Mar. 13, 2009 for U.S. Appl. No. 11/681,406, filed Mar. 2, 2007 (Applicant—Vistakon; Inventors—Nakamura, et al.; (12 pages).
Non-Final Rejection issued on Nov. 13, 2008 for U.S. Appl. No. 11/681,406, filed Mar. 2, 2007 (Applicant—Vistakon; Inventors—; Nakamura, et al.; (6 pages).
Response to Office Action filed on Jul. 25, 2008 for U.S. Appl. No. 11/681,406, filed Mar. 2, 2007 (Applicant—Vistakon; Inventors—Nakamura, et al.; (34 pages).
Non-Final Rejection issued on Apr. 16, 2008 for U.S. Appl. No. 11/681,406, filed Mar. 2, 2007 (Applicant—Vistakon; Inventors—; Nakamura, et al.; (8 pages).
Response to Office Action filed on Feb. 5, 2008 for U.S. Appl. No. 11/681,406, filed Mar. 2, 2007 (Applicant—Vistakon; Inventors—Nakamura, et al.; (15 pages).
Non-Final Rejection issued on Sep. 14, 2007 for U.S. Appl. No. 11/681,406, filed Mar. 2, 2007 (Applicant—Vistakon; Inventors—; Nakamura, et al.; (6 pages).
Final Rejection filed on Jun. 7, 2012 for U.S. Appl. No. 11/561,525, filed Nov. 20, 2006 (Applicant—Vistakon; Inventors—Fujisawa, et al; (10 pages).
Response to Non-Final Rejection filed on Mar. 28, 2012 for U.S. Appl. No. 11/561,525, filed Nov. 20, 2006 (Applicant—Vistakon; Inventors—Fujisawa, et al; (11 pages).
Non-Final Rejection issued on Sep. 29, 2011 for U.S. Appl. No. 11/561,525, filed Nov. 20, 2006 (Applicant—Vistakon; Inventors—Fujisawa, et al; (10 pages).
Response to Non-Final Rejection filed Jul. 5, 2011 for U.S. Appl. No. 11/561,525, filed Nov. 20, 2006 (Applicant—Vistakon; Inventors—Fujisawa, et al; (10 pages).
Non-Final Rejection issued on Jan. 4, 2011 for U.S. Appl. No. 11/561,525, filed Nov. 20, 2006 (Applicant—Vistakon; Inventors—Fujisawa, et al; (6 pages).
Request for Continued Examination filed on Nov. 24, 2010 for U.S. Appl. No. 11/561,525, filed Nov. 20, 2006 (Applicant—Vistakon; Inventors—Fujisawa, et al; (14 pages).
Final Rejection issued on May 24, 2010 for U.S. Appl. No. 11/561,525, filed Nov. 20, 2006 (Applicant—Vistakon; Inventors—Fujisawa, et al; (8 pages).
Response to Non-Final Rejection filed on Feb. 16, 2010 for U.S. Appl. No. 11/561,525, filed Nov. 20, 2006 (Applicant—Vistakon; Inventors—Fujisawa, et al; (13 pages).
Non-Final Rejection issued on Sep. 14, 2009 U.S. Appl. No. 11/561,525, filed Nov. 20, 2006 (Applicant—Vistakon; Inventors—Fujisawa, et al; (11 pages).
Examiner Interview Summary Record issued on Jul. 31, 2009 for U.S. Appl. No. 11/561,525, filed Nov. 20, 2006 (Applicant—Vistakon; Inventors—Fujisawa, et al; (4 pages).
Response to Non-Final Rejection filed on Mar. 30, 2009 for U.S. Appl. No. 11/561,525, filed Nov. 20, 2006 (Applicant—Vistakon; Inventors—Fujisawa, et al; (5 pages).
Non-Final Rejection issued on Oct. 30, 2008 for U.S. Appl. No. 11/561,525, filed Nov. 20, 2006 (Applicant—Vistakon; Inventors—Fujisawa, et al; (10 pages).
Response to Non-Final Rejection filed on Aug. 5, 2008 for U.S. Appl. No. 11/561,525, filed Nov. 20, 2006 (Applicant—Vistakon; Inventors—Fujisawa, et al; (28 pages).
Non-Final Rejection issued on Apr. 8, 2008 for U.S. Appl. No. 11/561,525, filed Nov. 20, 2006 (Applicant—Vistakon; Inventors—Fujisawa, et al; (13 pages).
Non-Final Rejection issued on Jun. 27, 2013 for U.S. Appl. No. 13/746,268, filed Jan. 21, 2013 (Applicant—Vistakon; Inventor—Fujisawa; (5 pages).
Issue Notification issued on Dec. 29, 2012 for U.S. Appl. No. 12/901,191, filed Oct. 8, 2010 (Applicant—; Vistakon; Inventor—Fujisawa; (1 page).
Notice of Allowance issued on Sep. 4, 2012 for U.S. Appl. No. 12/901,191, filed Oct. 8, 2010 (Applicant—; Vistakon; Inventor—Fujisawa; (5 pages).
Response to Non-Final Rejection filed on Jun. 20, 2012 for U.S. Appl. No. 12/901,191, filed Oct. 8 2010 (Applicant—; Vistakon; Inventor—Fujisawa; (26 pages).
Non-Final Rejection issued on Dec. 20, 2011 for U.S. Appl. No. 12/901,191, filed Oct. 8, 2010 (Applicant—; Vistakon; Inventor—Fujisawa; (5 pages).
Response to Election/Restriction Requirement filed on Oct. 27, 2011 for U.S. Appl. No. 12/901,191, filed Oct. 8, 2010 (Applicant—; Vistakon; Inventor—Fujisawa; (16 pages).
Requirement for Restriction/Election issued on Apr. 27, 2011 for ; U.S. Appl. No. 12/901,191, filed on Oct. 8, 2010 (Applicant—; Vistakon; Inventor—Fujisawa; (10 pages).
Issue Notification issued on Nov. 3, 2010 for U.S. Appl. No. 11/561,456, filed Nov. 20, 2006 (Applicant—Vistakon; Inventor—; Fujisawa; (1 page).
Notice of Allowance issued on Jul. 8, 2010 for U.S. Appl. No. 11/561,456, filed Nov. 20, 2006 (Applicant—Vistakon; Inventor—; Fujisawa; (6 pages).
Response After Final Action filed on Jun. 28, 2010 for U.S. Appl. No. 11/561,456, filed Nov. 20, 2006 (Applicant—Vistakon; Inventor—Fujisawa; (14 pages).

(56) References Cited

OTHER PUBLICATIONS

Examiner Interview Summary Record issued on May 26, 2010 ; for U.S. Appl. No. 11/561,456, filed Nov. 20, 2006 (Applicant—; Vistakon; Inventor—Fujisawa; (3 pages).
Final Rejection issued on May 6, 2010 for U.S. Appl. No. 11/561,456, filed Nov. 20, 2006 (Applicant—Vistakon; Inventor—; Fujisawa; (6 pages).
Response to Non-Final Rejection filed on Feb. 24, 2010 for U.S. Appl. No. 11/561,456, filed Nov. 20, 2006 (Applicant—Vistakon; ; Inventor—Fujisawa; (23 pages).
Non-Final Rejection issued on Oct. 27, 2009 for U.S. Appl. No. 11/561,456, filed Nov. 20, 2006 (Applicant—Vistakon; Inventor—Fujisawa; (10 pages).
Response to Election/Restriction Requirement filed on Aug. 11, 2009 for U.S. Appl. No. 11/561,456, filed Nov. 20, 2006 (Applicant—Vistakon; Inventor—Fujisawa; (15 pages).
Requirement for Restriction/Election issued on Jun. 11, 2009 for; U.S. Appl. No. 11/561,456, filed Nov. 20, 2006 (Applicant—; Vistakon; Inventor—Fujisawa; (11 pages).
Notice of Allowance issued on Jun. 24, 2013 for U.S. Appl. No. 11/609,724, filed Dec. 12, 2006 (Applicant—Vistakon; Inventors—Nakamura, et al.; (8 pages).
Request for Continued Examination filed on Sep. 28, 2011 for U.S. Appl. No. 11/609,724, filed Dec. 12, 2006 (Applicant—Vistakon; Inventors—Nakamura, et al.; (10 pages).
Final Rejection issued on Mar. 29, 2011 for U.S. Appl. No. 11/609,724, filed Dec. 12, 2006 (Applicant—Vistakon; Inventors—Nakamura, et al.; (7 pages).
Non-Final Rejection issued on Sep. 2, 2010 for U.S. Appl. No. 11/609,724, filed Dec. 12, 2006 (Applicant—Vistakon; Inventors—Nakamura, et al.; (9 pages).
Request for Continued Examination filed on Apr. 15, 2010 ffor U.S. Appl. No. 11/609,724, filed Dec. 12, 2006 (Applicant—Vistakon; Inventors—Nakamura, et al.; (18 pages).
Examiner Interview Summary Record (PTOL—413) issued on Nov. 9, 2009 for U.S. Appl. No. 11/609,724, filed Dec. 12, 2006 (Applicant—Vistakon; Inventors—Nakamura, et al.; (2 pages).
Final Rejection issued on Nov. 9, 2009 for U.S. Appl. No. 11/609,724, filed Dec. 12, 2006 (Applicant—Vistakon; Inventors—Nakamura, et al.; (6 pages).
Response to Office Action filed on Aug. 18, 2009 for U.S. Appl. No. 11/609,724, filed Dec. 12, 2006 (Applicant—Vistakon; Inventors—Nakamura, et al.; (16 pages).
Non-Final Rejection issued on Mar. 27, 2009 for U.S. Appl. No. 11/609,724, filed Dec. 12, 2006 (Applicant—Vistakon; Inventors—Nakamura, et al.; (7 pages).
Response to Office Action filed on Jan. 22, 2009 for U.S. Appl. No. 11/609,724, filed Dec. 12, 2006 (Applicant—Vistakon; Inventors—Nakamura, et al.; (19 pages).
Non-Final Rejection issued on Jul. 22, 2008 for U.S. Appl. No. 11/609,724, filed Dec. 12, 2006 (Applicant—Vistakon; Inventors—Nakamura, et al.; (7 pages).
Election Under Restriction Requirement issued on Jun. 12, 2008 for U.S. Appl. No. 11/609,724, filed Dec. 12, 2006 (Applicant—Vistakon; Inventors—Nakamura, et al.; (11 pages).
Requirement for Restriction/Election issued on Mar. 17, 2008 for U.S. Appl. No. 11/609,724, filed Dec. 12, 2006 (Applicant—Vistakon; Inventors—Nakamura, et al.; (9 pages).
Response to Amendment issued on Oct. 19, 2011 for U.S. Appl. No. 11/609,977, filed Dec. 12, 2006 (Applicant—Vistakon; Inventors—Nakamura, et al; (2 pages).
Amendment after Notice of Allowance filed with the USPTO ; on Oct. 19, 2011 for U.S. Appl. No. 11/609,977, filed Dec. 12, 2006 (Applicant—Vistakon; Inventors—Nakamura, et al; (2 pages).
Issue Notification issued on Oct. 19, 2011for U.S. Appl. No. 11/609,977, filed Dec. 12, 2006 (Applicant—Vistakon; Inventors—Nakamura, et al; (1 page).
Amendment after Notice of Allowance filed with the USPTO ; on Sep. 22, 2011 for U.S. Appl. No. 11/609,977, filed Dec. 12, 2006 (Applicant—Vistakon; Inventors—Nakamura, et al; (2 pages).

Notice of Allowance issued on Jul. 21, 2011 for U.S. Appl. No. 11/609,977, filed Dec. 12, 2006 (Applicant—Vistakon; Inventors—Nakamura, et al; (12 pages).
Response to Office Action filed with the USPTO on May 3, 2011; for U.S. Appl. No. 11/609,977, filed Dec. 12, 2006 (Applicant—Vistakon; Inventors—Nakamura, et al; (12 pages).
Non-Final Office Action issued on Nov. 9, 2010 for U.S. Appl. No. 11/609,677, filed Dec. 12, 2006 (Applicant—Vistakon; Inventors—Nakamura, et al; (8 pages).
Request for Continued Examination filed with the USPTO ; on Aug. 16, 2010 for U.S. Appl. No. 11/609,677, filed Dec. 12, 2006 ; (Applicant—Vistakon; Inventors—Nakamura, et al; (14 pages).
Final Rejection issued on Mar. 15, 2010 for U.S. Appl. No. 11/609,677, filed Dec. 12, 2006 (Applicant—Vistakon; Inventors—Nakamura, et al; (6 pages).
Response to Office Action filed with the USPTO on Nov. 11, 2009 ; for U.S. Appl. No. 11/609,977, filed Dec. 12, 2006 (Applicant—Vistakon; Inventors—Nakamura, et al; (10 pages).
Non-Final Office Action issued on May 11, 2009 for U.S. Appl. No. 11/609,677, filed Dec. 12, 2006 (Applicant—Vistakon; Inventors—Nakamura, et al.
International Search Report for PCT/US2007/015264.
International Search Report for PCT/US2007/020668.
International Search Report for PCT/US2007/020683.
International Preliminary Report issued on Jun. 29, 2010 for ; PCT/US2008/088287 filed on Dec. 24, 2008 and published as WO 2009/086444 on Jul. 9, 2009 (Applicant—Johnson & Johnson Vision Care, Inc.; Inventors—Fujisawa, et al.; (7 pages).
Written Opinion mailed on Apr. 28, 2009 for ; PCT/US2008/088287 filed on Dec. 24, 2008 and published as WO 2009/086444 on Jul. 9, 2009 (Applicant—Johnson & Johnson Vision Care, Inc.; Inventors—Fujisawa, et al.; (6 pages).
International Search Report mailed on Apr. 28, 2009 for ; PCT/US2008/088287 filed on Dec. 24, 2008 and published as WO 2009/086444 on Jul. 9, 2009 (Applicant—Johnson & Johnson Vision Care, Inc.; Inventors—Fujisawa, et al.; (3 pages).
Written Opinion mailed on Sep. 23, 2008 for ; PCT/US2008/068544 filed on Jun. 27, 2008 and published as WO 2009/006285 on Jan. 8, 2009 (Applicant—Johnson & Johnson Vision Care, Inc.; Inventors—Fujisawa, et al.; (5 pages).
International Preliminary Report on Patentability issued on Jan. 5, 2010 for PCT/US2008/068544 filed on Jun. 27, 2008 and published as WO 2009/006285 on Jan. 8, 2009 (Applicant—Johnson & Johnson Vision Care, Inc.; Inventors—Fujisawa, et al.; (6 pages).
International Search Report mailed on Sep. 23, 2008 for ; PCT/US2008/068544 filed on Jun. 27, 2008 and published as WO 2009/006285 on Jan. 8, 2009 (Applicant—Johnson & Johnson Vision Care, Inc.; Inventors—Fujisawa, et al.; (1 page).
Written Opinion mailed on Apr. 24, 2008 for PCT/US2007/024325 ; filed on Nov. 20, 2007 and published as WO 2008/066758 on Jun. 5, 2008 (Applicant—Johnson & Johnson Vision Care, Inc.; Inventors—Nakamura, et al.; (6 pages).
International Preliminary Report on Patentability issued on ; May 26, 2009 for PCT/US2007/024325 filed on Nov. 20, 2007 and published as WO 2008/066758 on Jun. 5, 2008 (Applicant—Johnson & Johnson Vision Care, Inc.; Inventors—Nakamura, et al.; (1 page).
Written Opinion mailed on Jan. 25, 2008 for PCT/US2007/020668 ; filed on Sep. 25, 2007 and published as WO 2008/042158 on Apr. 10, 2008 (Applicant—Johnson & Johnson Vision Care, Inc.; Inventors—Fujisawa, et al.; (7 pages).
International Preliminary Report on Patentability issued on ; Mar. 31, 2009 for PCT/US2007/020668 field on Sep. 25, 2007 and published as WO 2008/042158 on Apr. 10, 2008 (Applicant—Johnson & Johnson Vision Care, Inc.; Inventors—Fujisawa, et al.; (1 page).
Written Opinion mailed on Jan. 25, 2008 for PCT/US2007/020683 ; filed on Sep. 25, 2007 and published as WO 2008/042163 on Apr. 10, 2008 (Applicant—Johnson & Johnson Vision Care, Inc.; Inventors—Fujisawa, et al.; (5 pages).
International Preliminary Report on Patentabiilty issued on ; Mar. 31, 2009 for PCT/US2007/020683 filed on Sep. 25, 2007 and published as WO 2008/042163 on Apr. 10, 2008 (Applicant—Johnson & Johnson Vision Care, Inc.; Inventors—Fujisawa, et al.; (6 pages).

(56) References Cited

OTHER PUBLICATIONS

International Preliminary Report on Patentability issued on Jun. 16, 2009 for PCT/US2007/015150 filed on Jun. 28, 2007 and published as WO 2008/0147374 on Dec. 4, 2008 (Applicant—Johnson & Johnson Vision Care, Inc.; Inventors—Nakamura, et al.; (6 pages).
Written Opinion mailed on Jun. 9, 2009 for PCT/US2007/015150; filed on Jun. 28, 2007 and published as WO 2008/0147374 on Dec. 4, 2008 (Applicant—Johnson & Johnson Vision Care, Inc.; Inventors—Nakamura, et al.; (5 pages).
International Search Report mailed on Jun. 9, 2009 for ; PCT/US2007/015150 field on Jun. 28, 2007 and published as WO 2008/0147374 on Dec. 4, 2008 (Applicant—Johnson & Johnson Vision Care, Inc.; Inventors—Nakamura, et al.; (4 pages).

International Preliminary Report on Patentabiilty issued on Jul. 17, 2007; for PCT/SE2006/000023 filed on Sep. 1, 2006 and published; as WO 2006/075948 on Jul. 20, 2006 (Applicant—Molnlycke Health; Care AB; Inventors—Fabo, et al.
International Search Report issued by the International Bureau on ; Apr. 27, 2006 for PCT/SE2006/000023 filed on Sep. 1, 2006 and published ; as WO 2006/075948 on Jul. 20, 2006 (Applicant—Molnlycke Health; Care AB; Inventors—Fabo, et al.
Written Opinion issued by the International Bureau on; Apr. 27, 2006 for PCT/SE2006/000023 filed on Sep. 1, 2006 and published ; as WO 2006/075948 on Jul. 20, 2006 (Applicant—Molnlycke Health; Care AB; Inventors—Fabo, et al.

\* cited by examiner

SILICONE PREPOLYMER SOLUTIONS

CROSS-REFERENCE TO RELATED APPLICATIONS

This application is a continuation application of copending U.S. patent application Ser. No. 12/060,536, filed Apr. 1, 2008, which claims the benefit of U.S. Application No. 61/017,158 filed Dec. 27, 2007, each of which is hereby incorporated herein by reference in its entirety.

BACKGROUND

Contact lenses have been used commercially to improve vision since the 1950s. Many current contact lenses are made of hydrogels formed by polymerizing hydrophilic monomers such as hydroxyethylmethacrylate (HEMA) and vinylpyrrolidone in the presence of a minor amount of a crosslinking agent.

When producing continuous wear contact lenses, it can be advantageous to include silicone monomer in order to increase oxygen permeability in the lenses. However, as the amount of the silicone monomer in the reactive mixture is increased, dissolution with conventional solvent systems becomes more difficult and the resulting materials are typically hydrophobic.

In cases where non-aqueous solvents are used to dissolve hydrophobic materials, the solvent typically must be later removed by extraction or the like. Thus, a step of replacing the solvent with water is frequently utilized. Additionally, while some solvents can adequately dissolve silicone prepolymers, these solvents can irritate a contact lens wearer's eyes. Thus, complete removal of such a solvent becomes necessary. Moreover, some solvents (e.g., poly(ethylene glycol)) show less irritation to a contact lens wearer's eyes and provide a uniform and transparent silicone prepolymer solution. However, when polymer films prepared in such solutions are immersed in water, they become opaque. That is, polymerizations in such solvents typically result in unclear polymer films.

Therefore, there remains a need for methods and compositions that overcome these deficiencies and that effectively provide polymerization compositions wherein the monomers and/or prepolymers are soluble in water-soluble solvents and result in molded polymer films and articles exhibiting satisfactory oxygen permeability, minimal or nonexistent eye irritation, and highly transparent products.

SUMMARY

As embodied and broadly described herein, the invention, in one aspect, relates to silicone prepolymer compositions comprising a silicone prepolymer and a solvent.

In a further aspect, the invention relates to silicone prepolymer compositions comprising from about 20% to about 95% content by weight of the composition of a silicone prepolymer having an average silicon content of from about 10% to about 30% by weight of the prepolymer, and from about 5% to about 80% content by weight of the composition of a solvent.

In a further aspect, the invention relates to solvent compounds having a structure represented by formula (1s):

$$R^{11}\text{—O-G-}R^{13}, \tag{1s}$$

wherein $R^{11}$ and $R^{13}$ independently represent hydrogen or an organic radical comprising from 1 to 20 carbon atoms; and wherein G comprises: at least one group having a structure represented by formula (1s1):

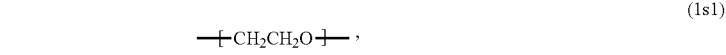
(1s1)

wherein the number of group(s) in G having a structure represented by formula (1s1) is defined as m=an integer of from 1 to 50; and at least one group having a structure represented by formula (1s2):

(1s2)

wherein the number of group(s) in G having a structure represented by formula (1s2) is defined as n=an integer of from 1 to 50, and wherein $R^{12}$ is a divalent organic radical comprising from 3 to 20 carbon atoms; and wherein m/(m+n) is from about 0.05 to about 0.95.

In a further aspect, the invention relates to solvent compounds having a structure represented by formula (2s):

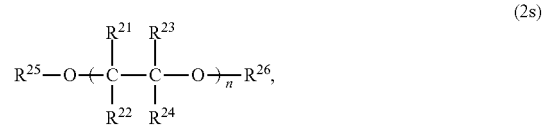
(2s)

wherein $R^{21}$ to $R^{24}$ independently represent hydrogen or an organic radical comprising from 1 to 20 carbon atoms; wherein $R^{25}$ and $R^{26}$ independently represent hydrogen or an organic radical comprising from 1 to 20 carbon atoms; wherein n represent integers of from 1 to 50; wherein the number of carbon atom in $R^{25}$ and $R^{26}$ is defined as r; and wherein (n+1)/(2n+r) is not more than about 0.45.

In a further aspect, the invention relates to polymers produced by polymerizing prepolymer from the disclosed compositions.

In a further aspect, the invention relates to ophthalmic lenses, e.g., contact lenses, produced from the disclosed polymers.

In a further aspect, the invention relates to products of the disclosed methods.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying drawings, which are incorporated in and constitute a part of this specification, illustrate several embodiments and together with the description illustrate the disclosed compositions and methods.

DETAILED DESCRIPTION

Figure 1:
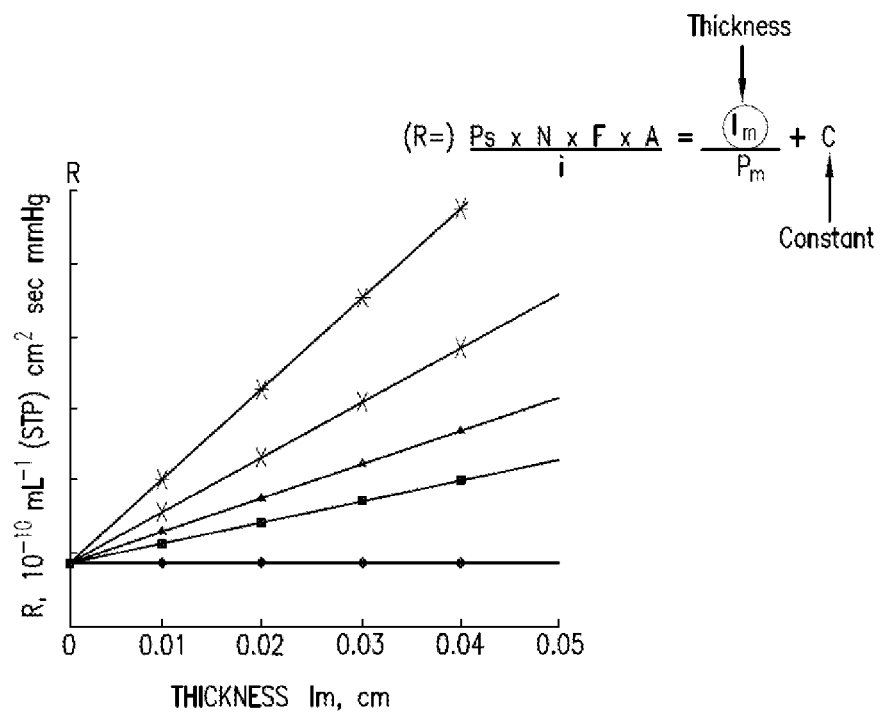
FIG. 1 shows a plot of R (1/Q) versus thickness (1 m).

The present invention can be understood more readily by reference to the following detailed description of the invention and the Examples included therein.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular embodiments only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein may be different from the actual publication dates, which may need to be independently confirmed.

A. Definitions

As used in the specification and the appended claims, the singular forms "a," "an" and "the" include plural referents unless the context clearly dictates otherwise. Thus, for example, reference to "a component," "a polymer," or "a residue" includes mixtures of two or more such components, polymers, or residues, and the like.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the term "residue" of a chemical species refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure

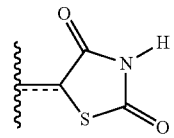

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

"Inorganic radicals," as the term is defined and used herein, contain no carbon atoms and therefore comprise only atoms other than carbon. Inorganic radicals comprise bonded combinations of atoms selected from hydrogen, nitrogen, oxygen, silicon, phosphorus, sulfur, selenium, and halogens such as fluorine, chlorine, bromine, and iodine, which can be present individually or bonded together in their chemically stable combinations. Inorganic radicals have 10 or fewer, or preferably one to six or one to four inorganic atoms as listed above bonded together. Examples of inorganic radicals include, but not limited to, amino, hydroxy, halogens, nitro, thiol, sulfate, phosphate, and like commonly known inorganic radicals. The inorganic radicals do not have bonded therein the metallic elements of the periodic table (such as the alkali metals, alkaline earth metals, transition metals, lanthanide metals, or actinide metals), although such metal ions can sometimes serve as a pharmaceutically acceptable cation for anionic inorganic radicals such as a sulfate, phosphate, or like anionic inorganic radical. Inorganic radicals do not comprise metalloids elements such as boron, aluminum, gallium, germanium, arsenic, tin, lead, or tellurium, or the noble gas elements, unless otherwise specifically indicated elsewhere herein.

As used herein, the terms "optional" or "optionally" means that the subsequently described event or circumstance may or may not occur, and that the description includes instances where said event or circumstance occurs and instances where it does not.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or form about two to about four.

As used herein, the term "prepolymer" refers to a polymer of relatively low molecular weight, usually intermediate between that of the monomer and the final polymer or resin, which may be mixed with compounding additives, and which is capable of being hardened by further polymerization during or after a forming process.

As used herein, the term "molecular weight" (MW) refers to the mass of one molecule of that substance, relative to the unified atomic mass unit u (equal to $1/12$ the mass of one atom of carbon-12).

As used herein, the term "number average molecular weight" ($M_n$) refers to the common, mean, average of the molecular weights of the individual polymers. $M_n$ can be determined by measuring the molecular weight of n polymer molecules, summing the weights, and dividing by n. $M_n$ is calculated by:

$$\overline{M}_n = \frac{\sum_i N_i M_i}{\sum_i N_i},$$

wherein $N_i$ is the number of molecules of molecular weight $M_i$. The number average molecular weight of a polymer can be determined by gel permeation chromatography, viscometry (Mark-Houwink equation), light scattering, analytical ultracentrifugation, vapor pressure osmometry, end-group titration, and colligative properties.

As used herein, the term "weight average molecular weight" ($M_w$) refers to an alternative measure of the molecular weight of a polymer. $M_w$ is calculated by:

$$\overline{M}_w = \frac{\sum_i N_i M_i^2}{\sum_i N_i M_i},$$

wherein $N_i$ is the number of molecules of molecular weight $M_i$. Intuitively, if the weight average molecular weight is w, and you pick a random monomer, then the polymer it belongs to will have a weight of w on average. The weight average molecular weight can be determined by light scattering, small angle neutron scattering (SANS), X-ray scattering, and sedimentation velocity.

As used herein, the terms "polydispersity" and "polydispersity index" refer to the ratio of the weight average to the number average ($M_w/M_n$).

As used herein, the terms "initiator" and "radical initiator" refer to substances that can produce radical species under mild conditions and promote radical polymerization reactions. These substances generally possess bonds that have small bond dissociation energies. Examples include halogen molecules, azo compounds, and organic peroxides. Chlorine, for example, gives two chlorine radicals (Cl.) by irradiation with ultraviolet light. Azo compounds (R—N=N—R') can be the precursor of two carbon-centered radicals (R. and R'.) and nitrogen gas upon heating and/or by irradiation. For example, AIBN and ABCN yield isobutyronitrile and cyclohexanecarbonitrile radicals, respectively. Organic peroxides each have a peroxide bond (—O—O—), which is readily cleaved to give two oxygen-centered radicals. For example, di-t(tertiary)-butylperoxide (tBuOOtBu) gives two t-butanoyl radicals (tBuO.) and the radicals become methyl radicals ($CH_3$.) with the loss of acetone. Benzoyl peroxide (($Ph-COO)_2$) generates benzoyloxyl radicals (PhCOO.), each of which loses carbon dioxide to be converted into a phenyl radical (Ph.).

As used herein, the term "polar moiety" refers to a functional group or part of a molecule bearing a polar group. A polar group is a functional group in which the distribution of electrons is uneven, thereby enabling it to take part in electrostatic interactions. Suitable polar groups include hydroxyl, amide, carboxyl, amino, carbonate, carbamate, sulfonamide, sulfonic, phosphonic, methoxyethyl, methoxyethoxyethyl, hydroxyethyl, and hydroxyethoxyethyl groups.

As used herein, the term "polar silicone-containing residue" refers to a residue containing at least one silicone function and at least one polar moiety.

As used herein, the terms "polymerizable moiety" and "polymerizable residue" refer to a chemical functionality capable of undergoing a polymerization reaction or cross-linking reaction to form a higher molecular weight compound and/or a more highly cross-linked structure. Suitable examples include methacryloyloxy groups, acryloyloxy groups, methacryl amide groups, acryl amide groups, styryl groups, vinyl groups, vinyl carbonate groups, vinyl carbamate groups, allyl carbonate groups, or allyl carbamate groups.

As used herein, the term "siloxanyl" refers to a structure having at least one Si—O—Si bond. Thus, for example, siloxanyl group means a group having at least one Si—O—Si group, and siloxanyl compound means a compound having at least one Si—O—Si group.

As used herein, the term "siloxanyl monomer" refers to a siloxanyl compound having at least one polymerizable carbon-carbon unsaturated bond. In one aspect, the polymerizable carbon-carbon unsaturated bond can be part of an alkylacryloyl moiety (e.g., acryloyl or a methacryloyl moiety).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. Unless explicitly disclosed, this disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

As used herein, the term "optionally substituted" includes both substituted and unsubstituted variations of the subject compound, group, radical, residue, or moiety. That is, in one aspect, the subject compound, group, radical, residue, or moiety can be substituted. In a further aspect, the subject compound, group, radical, residue, or moiety can be unsubstituted.

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, for example 1 to 12 carbon atoms or 1 to 6 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. A "lower alkyl" group is an alkyl group containing from one to six carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "polyalkylene group" as used herein is a group having two or more $CH_2$ groups linked to one another. The polyalkylene group can be represented by the formula —$(CH_2)_a$—, where "a" is an integer of from 2 to 500.

The terms "alkoxy" and "alkoxyl" as used herein refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This may be presumed in structural formulae herein wherein an asymmetric alkene is present, or it may be explicitly indicated by the bond symbol C=C. The alkenyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, substituted or unsubstituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino" as used herein are represented by the formula $NA^1A^2A^3$, where $A^1$, $A^2$, and $A^3$ can be, independently, hydrogen or substituted or unsubstituted alkyl, cycloalkyl, alkenyl, cycloalkenyl, alkynyl, cycloalkynyl, aryl, or heteroaryl group as described herein.

The term "carboxylic acid" as used herein is represented by the formula —C(O)OH.

The term "ester" as used herein is represented by the formula —OC(O)$A^1$ or —C(O)O$A^1$, where $A^1$ can be a substituted or unsubstituted alkyl, cycloalkyl, alkenyl, cycloalkenyl, alkynyl, cycloalkynyl, aryl, or heteroaryl group as described herein. The term "polyester" as used herein is represented by the formula -($A^1$O(O)C-$A^2$-C(O)O)$_a$— or -($A^1$O(O)C-$A^2$-OC(O))$_a$—, where $A^1$ and $A^2$ can be, independently, a substituted or unsubstituted alkyl, cycloalkyl, alkenyl, cycloalkenyl, alkynyl, cycloalkynyl, aryl, or heteroaryl group described herein and "a" is an integer from 1 to 500. "Polyester" is the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group described herein. The term "polyether" as used herein is represented by the formula -($A^1$O-$A^2$)$_a$-, where $A^1$ and $A^2$ can be, independently, a substituted or unsubstituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The terms "halide" and "halo" as used herein refer to the halogens fluorine, chlorine, bromine, and iodine.

The terms "hydroxy" and "hydroxyl" as used herein is represented by the formula —OH.

The term "ketone" and "keto" as used herein is represented by the formula $A^1C(O)A^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group as described herein.

The term "azide" as used herein is represented by the formula —$N_3$.

The term "nitro" as used herein is represented by the formula —$NO_2$.

The terms "nitrile" and "cyano" as used herein are represented by the formula —CN.

The term "silyl" as used herein is represented by the formula —Si$A^1A^2A^3$, where $A^1$, $A^2$, and $A^3$ can be, independently, hydrogen or a substituted or unsubstituted alkyl, cycloalkyl, alkoxy, alkenyl, cycloalkenyl, alkynyl, cycloalkynyl, aryl, or heteroaryl group as described herein.

The term "sulfo-oxo" as used herein is represented by the formulas —S(O)$A^1$, —S(O)$_2A^1$, —OS(O)$_2A^1$, or —OS(O)$_2$O$A^1$, where $A^1$ can be hydrogen or a substituted or unsubstituted alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —S(O)$_2A^1$, where $A^1$ can be hydrogen or a substituted or unsubstituted alkyl, cycloalkyl, alkenyl, cycloalkenyl, alkynyl, cycloalkynyl, aryl, or heteroaryl group as described herein. The term "sulfone" as used herein is represented by the formula $A^1$S(O)$_2A^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, a substituted or unsubstituted alkyl, cycloalkyl, alkenyl, cycloalkenyl, alkynyl, cycloalkynyl, aryl, or heteroaryl group as described herein.

The term "thiol" as used herein is represented by the formula —SH.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Silicone Prepolymer Compositions

In the preparation of silicone polymers, the use of prepolymers as starting materials can inhibit shrinkage during the polymerization step as well as eliminate the need to extract residual monomer. In the formation of contact lenses from silicone polymers, it can be desirable to increase the silicon content of the prepolymer in order to obtain sufficient oxygen permeability in the resulting polymer; however, it can be difficult to dissolve such prepolymers in water-soluble solvents.

Some non-aqueous solvents can be used to dissolve such silicone prepolymers; however, these can irritate eyes. Thus, subsequent removal of the non-aqueous solvent and replacement with water can become necessary. Some water-soluble solvents (e.g., poly(ethylene glycol)) show less irritation to eyes and can provide uniform silicone prepolymer solutions. However, polymer films made by polymerizing silicone prepolymer-poly(ethylene glycol) solutions become opaque when the films are immersed in water.

In contrast, the disclosed silicone prepolymer compositions comprise increased silicon content prepolymers in uniform, transparent solutions suitable as starting materials for polymerization. Moreover, polymers produced from these silicone prepolymer compositions provide eye-friendly, transparent films for use as ophthalmic lenses, including contact lenses, intraocular lenses, artificial cornea, and the like.

C. Compositions

In one aspect, the invention relates to a silicone prepolymer composition comprising from about 20% to about 95% content by weight of the composition of a silicone prepolymer having an average silicon content of from about 10% to about 30% by weight of the prepolymer, and from about 5% to about 80% content by weight of the composition of a solvent.

In one aspect, the solvent is a compound having a structure represented by formula (1s):

wherein $R^{11}$ and $R^{13}$ independently represent hydrogen or an organic radical comprising from 1 to 20 carbon atoms; and wherein G comprises at least one group having a structure represented by formula (1s1):

wherein the number of group(s) in G having a structure represented by formula (1s1) is defined as m=an integer of from 1 to 50; and at least one group having a structure represented by formula (1s2):

wherein the number of group(s) in G having a structure represented by formula (1s2) is defined as n=an integer of from 1 to 50, and wherein $R^{12}$ is a divalent organic radical comprising from 3 to 20 carbon atoms; wherein m and n independently represent integers of from 0 to 50, and wherein m/(m+n) is from about 0.05 to about 0.95.

In one aspect, the solvent is a compound having a structure represented by formula

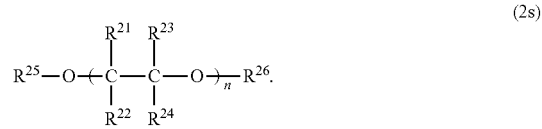

wherein $R^{21}$ to $R^{24}$ independently represent hydrogen or an organic radical comprising from 1 to 20 carbon atoms; wherein $R^{25}$ and $R^{26}$ independently represent hydrogen or an organic radical comprising from 1 to 20 carbon atoms; wherein n represent integers of from 1 to 50; wherein the number of carbon atom in $R^{25}$ and $R^{26}$ is defined as r; and wherein (n+1)/(2n+r) is not more than about 0.45.

In a further aspect, the invention relates to a silicone prepolymer composition comprising from about 20% to about 95% content by weight of the composition of a silicone prepolymer having an average silicon content of from about 10% to about 30% by weight of the prepolymer, and from about 5% to about 80% content by weight of the composition of a solvent selected from a compound having a structure represented by formula (1s):

$$R^{11}\text{—}O\text{-}G\text{-}R^{13}, \quad (1s)$$

wherein $R^{11}$ and $R^{13}$ independently represent hydrogen or an organic radical comprising from 1 to 20 carbon atoms; and wherein G comprises at least one group having a structure represented by formula (1s1):

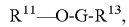  (1s1)

wherein the number of group(s) in G having a structure represented by formula (1s1) is defined as m=an integer of from 1 to 50; and at least one group having a structure represented by formula (1s2):

  (1s2)

wherein the number of group(s) in G having a structure represented by formula (1s2) is defined as n=an integer of from 1 to 50, and wherein $R^{12}$ is a divalent organic radical comprising from 3 to 20 carbon atoms; wherein m and n independently represent integers of from 0 to 50, and wherein m/(m+n) is from about 0.05 to about 0.95; or a compound having a structure represented by formula (2s):

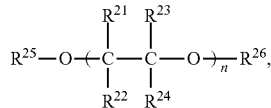  (2s)

wherein $R^{21}$ to $R^{24}$ independently represent hydrogen or an organic radical comprising from 1 to 20 carbon atoms; wherein $R^{25}$ and $R^{26}$ independently represent hydrogen or an organic radical comprising from 1 to 20 carbon atoms; wherein n represent integers of from 1 to 50; wherein the number of carbon atom in $R^{25}$ and $R^{26}$ is defined as r; and wherein (n+1)/(2n+r) is not more than about 0.45.

It is contemplated that mixtures of the two solvents can also be used. That is, in one aspect, the invention relates to a silicone prepolymer composition comprising from about 20% to about 95% content by weight of the composition of a silicone prepolymer having an average silicon content of from about 10% to about 30% by weight of the prepolymer, and from about 5% to about 80% content by weight of the composition of a solvent mixture comprising a compound having a structure represented by formula (1s):

$$R^{11}\text{—}O\text{-}G\text{-}R^{13}, \quad (1s)$$

wherein $R^{11}$ and $R^{13}$ independently represent hydrogen or an organic radical comprising from 1 to 20 carbon atoms; and wherein G comprises at least one group having a structure represented by formula (1s1):

  (1s1)

wherein the number of group(s) in G having a structure represented by formula (1s1) is defined as m=an integer of from 1 to 50; and at least one group having a structure represented by formula (1s2):

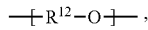  (1s2)

wherein the number of group(s) in G having a structure represented by formula (1s2) is defined as n=an integer of from 1 to 50, and wherein $R^{12}$ is a divalent organic radical comprising from 3 to 20 carbon atoms; wherein m and n independently represent integers of from 0 to 50, and wherein m/(m+n) is from about 0.05 to about 0.95; and a compound having a structure represented by formula

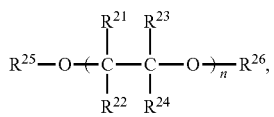  (2s)

wherein $R^{21}$ to $R^{24}$ independently represent hydrogen or an organic radical comprising from 1 to 20 carbon atoms; wherein $R^{25}$ and $R^{26}$ independently represent hydrogen or an organic radical comprising from 1 to 20 carbon atoms; wherein n represent integers of from 1 to 50; wherein the number of carbon atom in $R^{25}$ and $R^{26}$ is defined as r; and wherein (n+1)/(2n+r) is not more than about 0.45. In various aspects, the solvent having a structure represented by formula (1s) can be present in the solvent mixture as from about 5% to about 95% by weight of the total solvent. For example, the solvent having a structure represented by formula (1s) can be present at from about 10% to about 90%, from about 20% to about 80%, from about 30% to about 70%, from about 40% to about 60%, or about 50% of the total solvent mixture. In various aspects, the solvent having a structure represented by formula (2s) can be present in the solvent mixture as from about 5% to about 95% by weight of the total solvent. For example, the solvent having a structure represented by formula (2s) can be present at from about 10% to about 90%, from about 20% to about 80%, from about 30% to about 70%, from about 40% to about 60%, or about 50% of the total solvent mixture. It is also contemplated that the solvent mixture can further comprise a co-solvent.

In a further aspect, the silicone prepolymer solution further comprises an initiator, for example, 2,2'-azobis(2,4-dimethylvaleronitrile).

In a further aspect, the composition further comprises from about 1% to about 20% content by weight of the composition of poly(vinyl pyrolidone), for example, from about 1% to about 10%, from about 1% to about 8%, from about 1% to about 5%, or from about 1% to about 3%.

D. Solvents

Selection and use of an appropriate solvent in a silicone prepolymer composition can facilitate solvation of monomers and/or prepolymers. Further, selection and use of an appropriate solvent in a silicone prepolymer composition can provide water-soluble solvents. Even further, selection and use of an appropriate solvent in a silicone prepolymer composition can result in molded polymer films and articles that exhibit minimal or nonexistent eye irritation, and exhibit highly transparent products.

Without wishing to be bound by theory, it is believed that the transparency of the resulting molded product is related to the balance between hydrophilicity and hydrophobicity in the solvent selected. In certain aspects, a solvent can be provided with a desired balance between hydrophilicity and hydrophobicity by selection and modification of the structure in the backbone of the solvent molecules (e.g., variable organic residue solvents) and/or by selection and modification of the structure at the ends of the solvent molecules (e.g., variable organic endgroup solvents).

It is also contemplated that balance between hydrophilicity and hydrophobicity in the solvent can be achieved by selection and modification of the structure in the backbone of the solvent molecules (e.g., variable organic residue) and by selection and modification of the structure at the ends of the solvent molecules (e.g., variable organic endgroup) in the same solvent molecule. It is also contemplated that balance between hydrophilicity and hydrophobicity in the solvent can be achieved by selection and modification of the structure in the backbone of the solvent molecules (e.g., variable organic residue solvents) and by selection and modification of the structure at the ends of the solvent molecules (e.g., variable organic endgroup solvents) in different solvent molecules in the same solvent mixture.

1. Variable Organic Residue Solvents

In one aspect, a solvent can be provided with a desired balance between hydrophilicity and hydrophobicity by selection and modification of the structure in the backbone of the solvent molecules.

a. Structure

In one aspect, the solvent is a compound having a structure represented by formula (1s):

$$R^{11}\text{—O-G-}R^{13} \tag{1s}$$

wherein $R^{11}$ and $R^{13}$ independently represent hydrogen or an organic radical comprising from 1 to 20 carbon atoms; and wherein G comprises at least one group having a structure represented by formula (1s1):

wherein the number of group(s) in G having a structure represented by formula (1s1) is defined as m=an integer of from 1 to 50; and at least one group having a structure represented by formula (1s2):

wherein the number of group(s) in G having a structure represented by formula (1s2) is defined as n=an integer of from 1 to 50, and wherein $R^{12}$ is a divalent organic radical comprising from 3 to 20 carbon atoms; wherein m and n independently represent integers of from 0 to 50, and wherein m/(m+n) is from about 0.05 to about 0.95.

In one aspect, m can be an integer of from 1 to 50, from 1 to 30, from 1 to 20, from 1 to 10, from 1 to 9, from 1 to 8, from 1 to 7, from 1 to 6, from 1 to 5, or from 1 to 2. It is understood that the m units need not be sequential units. That is, the polymeric structure can be, but need not be, blocky in nature.

In one aspect, n can be an integer of from 1 to 50, from 1 to 30, from 1 to 20, from 1 to 10, from 1 to 9, from 1 to 8, from 1 to 7, from 1 to 6, from 1 to 5, or from 1 to 2. It is understood that the n units need not be sequential units. That is, the polymeric structure can be, but need not be, blocky in nature.

In one aspect, m/(m+n) can be from about 0.05 to about 0.95, from about 0.1 to about 0.9, from about 0.15 to about 0.85, from about 0.2 to about 0.8, from about 0.25 to about 0.75, from about 0.3 to about 0.7, from about 0.35 to about 0.65, from about 0.4 to about 0.6, from about 0.45 to about 0.55, or about 0.5. In a further aspect, m/(m+n) can be from about 0.05 to about 0.5 or from about 0.5 to about 0.95.

In one aspect, $R^{11}$ and $R^{13}$ independently represent hydrogen, a $C_1$-$C_{20}$ alkyl residue, or a $C_1$-$C_{20}$ aryl residue. In a further aspect, both $R^{11}$ and $R^{13}$ are hydrogen. In a further aspect, one of $R^{11}$ and $R^{13}$ is hydrogen and the other is a $C_1$-$C_{20}$ alkyl residue or a $C_1$-$C_{20}$ aryl residue. In a further aspect, one of $R^{11}$ and $R^{13}$ represents hydrogen and the other of $R^{11}$ and $R^{13}$ represents a $C_1$-$C_{10}$ alkyl residue or a $C_1$-$C_{10}$ aryl residue. In a further aspect, one or both of $R^{11}$ and $R^{13}$ represent a $C_1$-$C_{20}$ alkyl residue, for example, a $C_1$-$C_{16}$ alkyl residue, $C_1$-$C_{12}$ alkyl residue, $C_1$-$C_{10}$ alkyl residue, $C_1$-$C_8$ alkyl residue, $C_1$-$C_6$ alkyl residue, or $C_1$-$C_4$ alkyl residue. For example, each of $R^{11}$ and $R^{13}$ can independently comprise methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, or hexadecyl. It is understood that each $R^{11}$ and $R^{13}$ can be independently substituted or unsubstituted, linear or cyclic, and branched or unbranched.

In a further aspect, one or both of $R^{11}$ and $R^{13}$ represent a $C_1$-$C_{20}$ aryl residue, for example, a $C_1$-$C_{16}$ aryl residue, $C_1$-$C_{12}$ aryl residue, $C_1$-$C_{10}$ aryl residue, $C_1$-$C_8$ aryl residue, or $C_1$-$C_6$ aryl residue. For example, each of $R^{11}$ and $R^{13}$ can independently comprise benzyl, phenyl, naphthyl, biphenyl, thiophenyl, pyrrolyl, furanyl, or pyridinyl. It is understood that each $R^{11}$ and $R^{13}$ can be independently substituted or unsubstituted, linear or cyclic, and branched or unbranched. In a further aspect, one of $R^{11}$ and $R^{13}$ is a $C_1$-$C_{20}$ alkyl residue and the other is a $C_1$-$C_{20}$ aryl residue. In a further aspect, $R^{11}$ and $R^{13}$ can be selected to be a $C_1$-$C_{10}$ alkylsilyl (e.g., trimethylsilyl or t-butyldimethylsilyl) group.

In one aspect, the ethylene oxide residue(s) and —$R^{12}$—O— group(s) in the solvent represented by the formula(s) are randomly copolymerized.

In one aspect, $R^{12}$ comprises a divalent organic radical comprising from 3 to 20 carbon atoms, for example, from 3 to 16 carbon atoms, from 3 to 12 carbon atoms, from 3 to 10 carbon atoms, from 3 to 8 carbon atoms, from 3 to 6 carbon atoms, 4 carbon atoms, or 3 carbon atoms. In one aspect, $R^{12}$ is a residue of propylene oxide, butylene oxide, or trimethylene oxide. In a further aspect, $R^{12}$ represents a $C_3$-$C_{20}$ alkylene residue or a $C_3$-$C_{20}$ arylene residue.

In one aspect, the solvent has a structure represented by formula (1s), and $R^{12}$ has a structure represented by formula (1s2-1):

wherein $R^{14}$ represents a $C_1$-$C_{18}$ alkyl residue or a $C_1$-$C_{18}$ aryl residue. For example, $R^{14}$ can be an optionally substituted $C_1$-$C_{18}$ alkyl or aryl residue, an optionally substituted $C_1$-$C_{16}$ alkyl or aryl residue, an optionally substituted $C_1$-$C_{12}$ alkyl or aryl residue, an optionally substituted $C_1$-$C_{10}$ alkyl or aryl residue, an optionally substituted $C_1$-$C_8$ alkyl or aryl residue, an optionally substituted $C_1$-$C_6$ alkyl or aryl residue, or an optionally substituted $C_1$-$C_4$ alkyl or aryl residue. In a further aspect, $R^{14}$ can be methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, or hexadecyl.

In one aspect, the ratio of oxygen atom to carbon atom in the formula (1s) is not more than 0.37. For example, (the number of oxygen atom)/(the number of carbon atom) can be less than about 0.35, less than about 0.30, less than about 0.25, less than about 0.20, less than about 0.15, or less than about 0.10.

In a further aspect, the number average molecular weight of the solvent is not more than 450, not more than 425, not more than 400, not more than 375, not more than 350, not more than 325, or not more than 300.

In a further aspect, the solvent comprises one or more additional comonomers.

In one aspect, the solvent comprises a poly(ethylene glycol/propylene glycol) [poly(EG+PG)] random copolymer, (50:50) mono(n-butyl) ether.

It is understood that any one or more of the disclosed aspects, examples, or species can optionally be excluded from the invention.

b. Methods of Making

In one aspect, the disclosed solvents can be obtained commercially or obtained from commercially available materials. One having ordinary skill in the art will understand how to prepare the disclosed solvents. For example, the disclosed solvents can be prepared by known chemical reactions such as copolymerization of oxiranes including ethylene oxide and substituted ethylene oxides (e.g., propylene oxide, butylene oxide) or ring-opening metathesis reactions.

In one aspect, many of the disclosed solvents can be prepared by the alkylation of ethylene oxide-based copolymers. As shown below, 8,11,14-trimethyl-3,6,9,12,15-pentaoxaoctadecane-1,17-diol can be alkylated with, e.g., propyl bromide to provide 5,8,11,14-tetramethyl-4,7,10,13,16,19,22-heptaoxapentacosane:

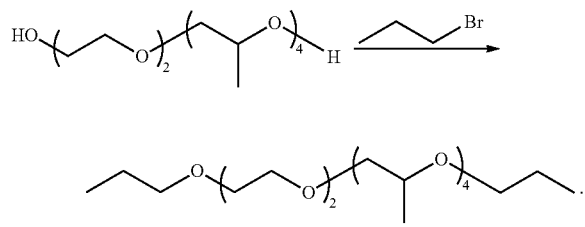

It is contemplated that more that one alkyl halide can be used in the same reaction. It is also understood that more or less than one molar equivalent of the halide can be added and that reaction product (or mixture of reaction products) can be controlled by stoichiometry of starting materials.

In a further aspect, a poly(ethylene glycol/butylene glycol) copolymer, dialkyl ether can be prepared:

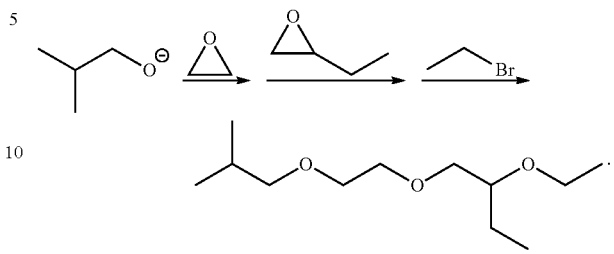

In a further aspect, a hybrid reaction scheme employing both polymerization and alkylation can be used:

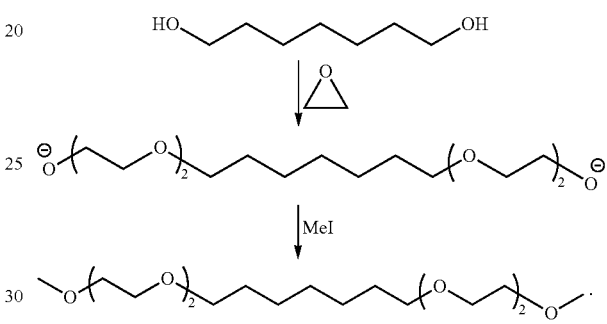

It is understood that any one or more of the disclosed aspects, examples, or species can optionally be excluded from the invention.

2. Variable Organic Endgroup Solvents

In one aspect, a solvent can be provided with a desired balance between hydrophilicity and hydrophobicity by selection and modification of the structure at the ends of the solvent molecules.

a. Structure

In one aspect, the solvent is a compound having a structure represented by formula (2s):

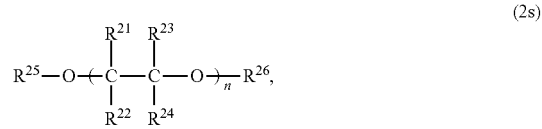

wherein $R^{21}$ to $R^{24}$ independently represent hydrogen or an organic radical comprising from 1 to 20 carbon atoms; wherein $R^{25}$ and $R^{26}$ independently represent hydrogen or an organic radical comprising from 1 to 20 carbon atoms; wherein n represent integers of from 1 to 50; wherein the number of carbon atom in $R^{25}$ and $R^{26}$ is defined as r; and wherein $(n+1)/(2n+r)$ is not more than about 0.45.

In one aspect, n can be an integer of from 1 to 50, from 1 to 30, from 1 to 20, from 1 to 10, from 1 to 9, from 1 to 8, from 1 to 7, from 1 to 6, from 1 to 5, from 1 to 4, from 1 to 3, or from 1 to 2.

In one aspect, $R^{21}$ to $R^{24}$ independently represent hydrogen, a $C_1$-$C_{20}$ alkyl residue, or a $C_1$-$C_{20}$ aryl residue. In a further aspect, one or more of $R^{21}$ to $R^{24}$ represent a $C_1$-$C_{20}$ alkyl residue, for example, a $C_1$-$C_{16}$ alkyl residue, $C_1$-$C_{12}$ alkyl residue, $C_1$-$C_{10}$ alkyl residue, $C_1$-$C_8$ alkyl residue, $C_1$-$C_6$ alkyl residue, or $C_1$-$C_4$ alkyl residue. For example, each of $R^{21}$ to $R^{24}$ can independently comprise methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, or hexadecyl. It is understood that each $R^{21}$ to $R^{24}$ can be independently substituted or unsubstituted, linear or cyclic, and branched or unbranched. In a further aspect, two or more of $R^{21}$ to $R^{24}$ together form a ring structure In one aspect, all of $R^{21}$ to $R^{24}$ are hydrogen (i.e., ethylene glycol residue). In a further aspect, three of $R^{21}$ to $R^{24}$ are hydrogen and the other is C1 to C4 alkyl, for example, methyl, ethyl, propyl, or butyl (i.e., propylene glycol, butylene glycol, or higher glycol residue).

In one aspect, $R^{25}$ and $R^{26}$ independently represent hydrogen, a $C_1$-$C_{20}$ alkyl residue, or a $C_1$-$C_{20}$ aryl residue. In a further aspect, one of $R^{25}$ and $R^{26}$ is hydrogen and the other is a $C_3$-$C_{20}$ alkyl residue or a $C_3$-$C_{20}$ aryl residue. In a further aspect, one of $R^{25}$ and $R^{26}$ represents hydrogen and the other of $R^{25}$ and $R^{26}$ represents a $C_3$-$C_{10}$ alkyl residue or a $C_3$-$C_{10}$ aryl residue. In a further aspect, one or both of $R^{25}$ and $R^{26}$ represent a $C_1$-$C_{20}$ alkyl residue, for example, a $C_1$-$C_{16}$ alkyl residue, $C_1$-$C_{12}$ alkyl residue, $C_1$-$C_{10}$ alkyl residue, $C_1$-$C_8$ alkyl residue, $C_1$-$C_6$ alkyl residue, or $C_1$-$C_4$ alkyl residue. For example, each of $R^{25}$ and $R^{26}$ can independently comprise methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, or hexadecyl. It is understood that each $R^{25}$ and $R^{26}$ can be independently substituted or unsubstituted, linear or cyclic, and branched or unbranched.

In a further aspect, one or both of $R^{25}$ and $R^{26}$ represent a $C_1$-$C_{20}$ aryl residue, for example, a $C_1$-$C_{16}$ aryl residue, $C_1$-$C_{12}$ aryl residue, $C_1$-$C_{10}$ aryl residue, $C_1$-$C_8$ aryl residue, or $C_1$-$C_6$ aryl residue. For example, each of $R^{25}$ and $R^{26}$ can independently comprise benzyl, phenyl, naphthyl, biphenyl, thiophenyl, pyrrolyl, furanyl, or pyridinyl. It is understood that each $R^{25}$ and $R^{26}$ can be independently substituted or unsubstituted, linear or cyclic, and branched or unbranched. In a further aspect, one of $R^{25}$ and $R^{26}$ is a $C_1$-$C_{20}$ alkyl residue and the other is a $C_1$-$C_{20}$ aryl residue. In a further aspect, $R^{25}$ and $R^{26}$ can be selected to be a $C_1$-$C_{20}$ alkylsilyl (e.g., trimethylsilyl or t-butyldimethylsilyl) group.

In a further aspect, the solvent has a structure represented by formula (2s), and wherein (n+1)/(2n+r) is not more than 0.40. For example, the solvent can be selected so that (n+1)/(2n+r) is not more than 0.38, not more than 0.35, not more than 0.32, not more than 0.30, not more than 0.25, or not more than 0.20. The minimum total number of carbons for $R^{25}$ and $R^{26}$, and the corresponding (n+1)/(2n+r), for various n is tabulated below:

TABLE 1

| N | minimum total carbons for $R^{25}$ + $R^{26}$ | (n + 1)/(2n + r) |
|---|---|---|
| 1 | 3 | 0.4 |
| 2 | 4 | 0.375 |
| 3 | 4 | 0.4 |
| 4 | 4 | 0.416666667 |
| 5 | 4 | 0.428571429 |
| 6 | 5 | 0.411764706 |
| 7 | 5 | 0.421052632 |
| 8 | 5 | 0.428571429 |
| 9 | 5 | 0.434782609 |
| 10 | 5 | 0.44 |

TABLE 1-continued

| N | minimum total carbons for $R^{25}$ + $R^{26}$ | (n + 1)/(2n + r) |
|---|---|---|
| 12 | 6 | 0.433333333 |
| 16 | 7 | 0.435897436 |
| 20 | 8 | 0.4375 |
| 24 | 9 | 0.438596491 |
| 30 | 10 | 0.442857143 |
| 40 | 12 | 0.445652174 |
| 50 | 14 | 0.447368421 |

In a further aspect, the number average molecular weight of the solvent is not more than 450, not more than 425, not more than 400, not more than 375, not more than 350, not more than 325, or not more than 300.

In a further aspect, the solvent comprises one or more additional comonomers.

In one aspect, the solvent comprises one or more of ethylene glycol mono n-butyl ether, ethylene glycol mono n-hexyl ether, diethylene glycol mono n-butyl ether, diethylene glycol mono n-hexyl ether, triethylene glycol mono n-butyl ether, or triethylene glycol mono i-propyl ether.

It is understood that any one or more of the disclosed aspects, examples, or species can optionally be excluded from the invention.

b. Methods of Making

In one aspect, the disclosed solvents can be obtained commercially or obtained from commercially available materials. One having ordinary skill in the art will understand how to prepare the disclosed solvents.

In one aspect, many of the disclosed solvents can be prepared by the alkylation of alkylene oxide-based copolymers. As shown below, 2,5,8,11,14-pentamethyl-3,6,9,12,15-pentaoxaoctadecane-1,17-diol can be alkylated with, e.g., propyl bromide to provide 5,8,11,14,17,20-hexamethyl-4,7,10,13,16,19,22-heptaoxapentacosane:

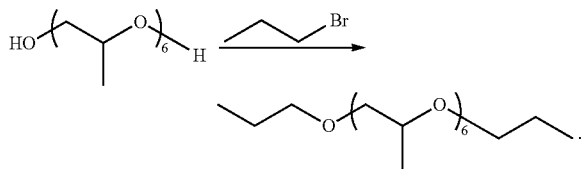

It is contemplated that more that one alkyl halide can be used in the same reaction. It is also understood that more or less than one molar equivalent of the halide can be added and that reaction product (or mixture of reaction products) can be controlled by stoichiometry of starting materials.

In a further aspect, a $C_1$-$C_{20}$ alkylsilyl (e.g., trimethylsilyl or t-butyldimethylsilyl) group can be used:

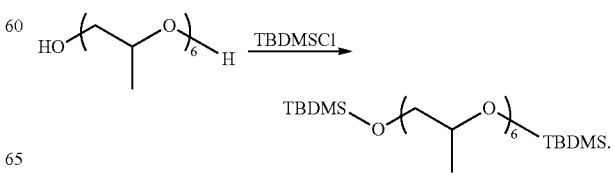

In a further aspect, a poly(ethylene glycol/butylene glycol) copolymer, dialkyl ether can be prepared:

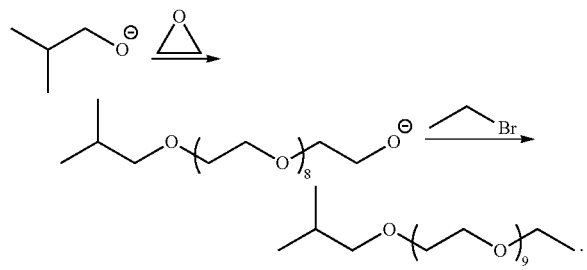

It is understood that any one or more of the disclosed aspects, examples, or species can optionally be excluded from the invention.

3. Solvation

In one aspect, the disclosed solvents exhibit superior solvation of silicone polymers and/or prepolymers. Solvation can be determined by tests in which a sample of the solvent is used to dissolve a number of different polymers or prepolymers. By observing whether the polymer or prepolymer is dissolved, swelled, or unchanged, it is possible to ascertain whether and to what extent a prepolymer is soluble in a given solvent system. See Hansen Solubility Parameters; A User's Handbook, Charles M. Hansen, pp. 43-53, CRC Press 2000. For example, a known mass of prepolymer can be exposed to an excess amount of a given solvent system for a period of time (e.g., 10 minutes). The mixture can be optionally sonicated and/or exposed to elevated temperature. Afterwards, any undissolved prepolymer can be removed by decantation or by filtration, and the proportion dissolved within the solvent system can be calculated.

Solvation can be determined by using a protocol of the following example (note that wt % is an example for 60 wt % solid solution): (1) Irgacure 819 (a photo-initiator, 0.42 wt %) and a prepolymer (55.38 wt %) are added into a solvent to form a mixture. (2) The mixture is mixed well with a touch mixer and by sonication. (3) The mixture is put in an oven at 70° C. for about one hour. (4) The mixture removed from the oven and mixed with a spatula. (5) The mixture is put in the oven again for another 40 minutes. (6) Repeat steps 4 and 5. (7) If the mixture is clear and phase separation is not observed when the mixture is taken out from the oven, it is considered "soluble." If the mixture is hazy or phase separation is observed, it is considered "insoluble."

4. Co-Solvents

It is also contemplated that the disclosed solvents can be used in combination with one or more co-solvents. In one aspect, the identity and amount of co-solvent is selected so as to not decrease the solubility of a prepolymer or polymer in a disclosed solvent. Suitable co-solvents include water-soluble solvents such as ethylene glycol, propylene glycol, polyethylene glycol, polypropylene glycol, ethylene glycol-propylene glycol copolymer, and mixtures thereof. Further suitable co-solvents include methanol, ethanol, tetrahydrofuran, N,N-dimethylformamide, acetone, and acetonitrile.

E. Prepolymers

In one aspect, the invention relates to one or more silicone prepolymers. More specifically, compounds are disclosed wherein undesirable shrinkage, expansion, and related problems possessed by conventional silicone monomers and related conventional polymerization techniques can be overcome by producing hydrogels from a crosslinkable prepolymer having a relatively low molecular weight and low polydispersity. Moreover, the disclosed prepolymers are prepared having structures that provide satisfactory solubilities in aqueous solutions or hydrophilic solutions, such as PEG/PVP, as well as desirable oxygen permeabilities.

1. Structure

In one aspect, a prepolymer can be a compound or collection of compounds comprising at least one silicone-containing residue having a structure represented by the formula:

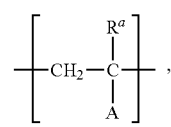

wherein $R^a$ represents hydrogen or methyl, and wherein A represents a siloxanyl group; and at least one polymerizable residue having a structure represented by the formula:

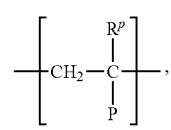

wherein $R^p$ represents hydrogen or methyl, and wherein P represents an organic group comprising at least one polymerizable moiety; wherein the prepolymer has a silicon content of from about 10% to about 30% by weight, of the prepolymer; wherein at least one of the at least one silicone-containing residue is a polar silicone-containing residue further comprising at least one polar moiety; and wherein the prepolymer has a polar silicone-containing residue content of from about 30% to about 90% by weight of the prepolymer.

a. Siloxanyl Groups

In one aspect, the disclosed prepolymers comprise one or more siloxanyl groups. Unless otherwise specifically described, a siloxanyl group can be any siloxanyl group known to those of skill in the art.

In a further aspect, at least one A has a structure represented by the formula:

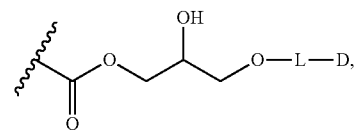

wherein L represents a $C_1$-$C_{20}$ alkyl residue or a $C_1$-$C_{20}$ aryl residue; and wherein D represents a siloxanyl group. In a still further aspect, at least one A has a structure represented by the formula:

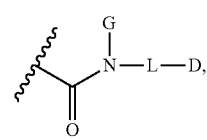

wherein G represents a $C_1$-$C_{20}$ alkyl residue or a $C_1$-$C_{20}$ aryl residue, which alkyl residue or aryl residue further comprises at least one hydroxyl group; wherein L represents a $C_1$-$C_{20}$ alkyl residue or a $C_1$-$C_{20}$ aryl residue; and wherein D represents a siloxanyl group.

In a further aspect, D has a structure represented by the formula:

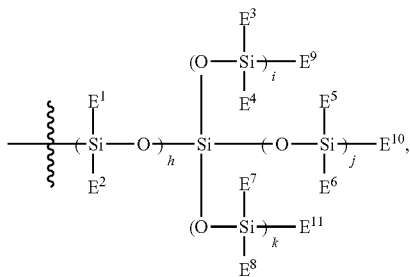

wherein $E^1$ to $E^{11}$ independently represent hydrogen, an optionally substituted $C_1$-$C_{20}$ alkyl residue, or an optionally substituted $C_6$-$C_{20}$ aryl residue; wherein h represents an integer of from 0 to 200; and wherein i, j, and k independently represent integers of from 0 to 20, with the proviso that h, i, j and k are not simultaneously zero.

In a further aspect, at least one A has a structure represented by the formula:

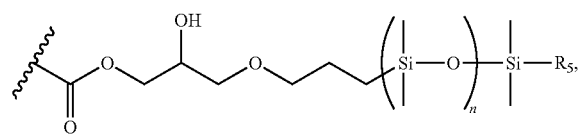

wherein n represents an integer of from 3 to 10; and wherein $R_s$ represents a $C_1$-$C_{20}$ alkyl residue or a $C_1$-$C_{20}$ aryl residue.

It is understood that any one or more of the disclosed aspects, examples, or species can optionally be excluded from the invention.

b. Hydrophilic Residues

In one aspect, the disclosed prepolymers comprise one or more hydrophilic residues. Unless otherwise specifically described, a hydrophilic residue can be any hydrophilic residue known to those of skill in the art. In certain aspects, hydrophilic residues can be absent from the disclosed prepolymers.

In a further aspect, a prepolymer can further comprise at least one at least one hydrophilic residue having a structure represented by the formula:

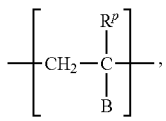

wherein $R^b$ represents hydrogen or methyl; and wherein B represents a hydrophilic group.

In a further aspect, a hydrophilic residue comprises one or more residues of N,N-dimethylacrylamide, 2-hydroxyethyl methacrylate, N-vinylpyrrolidone, N-vinylformamide, N-vinylacetamide,(meth)acrylic acid, N-vinyl-2-piperidone, N-vinyl-2-caprolactam, N-vinyl-3-methyl-2-caprolactam, N-vinyl-3-methyl-2-piperidone, N-vinyl-4-methyl-2-piperidone, N-vinyl-4-methyl-2-caprolactam, N-vinyl-3-ethyl-2-pyrrolidone, N-vinyl-4,5-dimethyl-2-pyrrolidone, or N-vinylimidazole.

It is understood that any one or more of the disclosed aspects, examples, or species can optionally be excluded from the invention.

c. Polar Moieties

In one aspect, the disclosed prepolymers comprise one or more polar moieties. Unless otherwise specifically described, a polar moiety can be any polar moiety known to those of skill in the art. In a further aspect, a polar moiety can be hydroxyl, amide, carboxyl, amino, carbonate, carbamate, sulfonamide, sulfonic, phosphonic, methoxyethyl, methoxyethoxyethyl, hydroxyethyl, or hydroxyethoxyethyl.

It is understood that any one or more of the disclosed aspects, examples, or species can optionally be excluded from the invention.

d. Polymerizable Residues

In one aspect, the disclosed prepolymers comprise one or more polymerizable residues or groups. Unless otherwise specifically described, a polymerizable residue can be any polymerizable residue known to those of skill in the art. In a further aspect, a polymerizable residue comprises one or more ethylenically unsaturated moieties, for example, a methacryloyloxy group, an acryloyloxy group, a methacryl amide group, an acryl amide group, a styryl group, a vinyl group, a vinyl carbonate group, a vinyl carbamate group, an allyl carbonate group, or an allyl carbamate group.

In a further aspect, a polymerizable residue is obtained by reacting a unit having a structure represented by the formula:

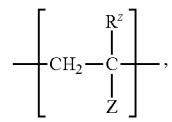

wherein $R^z$ represents hydrogen or methyl; wherein Z represents an optionally substituted $C_1$-$C_{20}$ alkyl residue or an optionally substituted $C_6$-$C_{20}$ aryl residue, which alkyl or aryl further comprises at least one of an hydroxyl group, a carboxyl group, an ester group, or a carboxylic anhydride group; with at least one compound having at least one polymerizable residue.

In a further aspect, Z comprises one or more of:

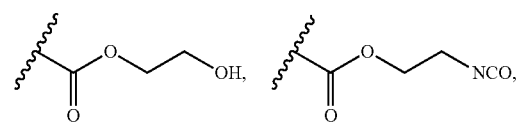

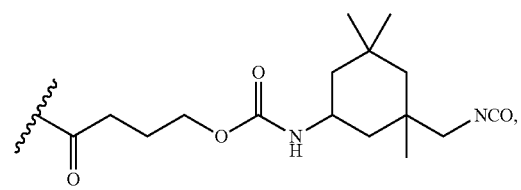

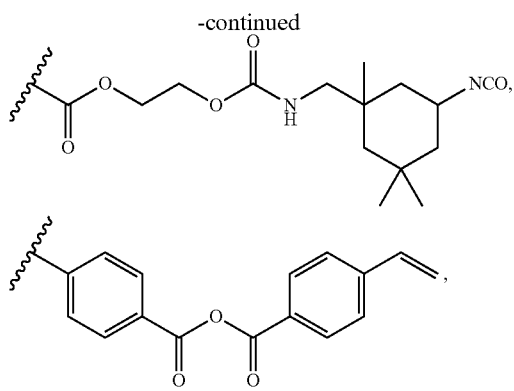

a halogenocarbonyl group, a (meth)acryloyloxycarbonyl group, a carboxyl group, a $C_1$-$C_{20}$ alkyloxycarbonyl group, a 2-aminoethoxycarbonyl group, a 4-halogenocarbophenyl group, a 4-carboxyphenyl group, or a 4-($C_1$-$C_{20}$ alkyloxycarbonyl)phenyl group.

In one aspect, the compound having at least one polymerizable group is 2-isocyanatoethyl(meth)acrylate, (meth)acryloyl isocyanate,

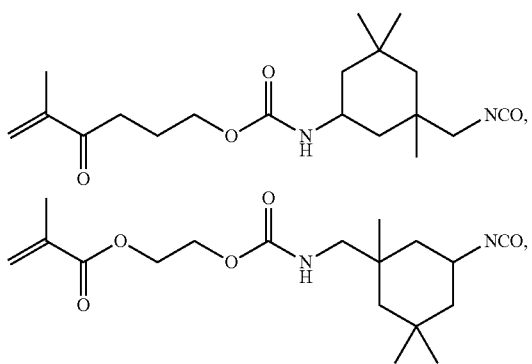

(meth)acrylic acid halide, (meth)acrylic anhydride, (meth) acrylic acid, methyl(meth)acrylate, ethyl(meth)acrylate, 2-hydroxyethyl(meth)acrylate, 2-aminoethyl(meth)acrylate, 4-vinylbenzoic acid halide, 4-vinylbenzoic anhydride, or 4-vinylbenzoic acid ester.

In a further aspect, at least one polymerizable moiety has a structure represented by the formula:

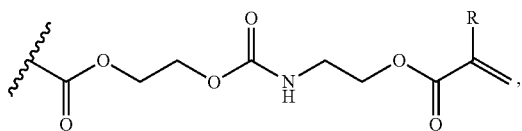

wherein R represents hydrogen or methyl.

It is understood that any one or more of the disclosed aspects, examples, or species can optionally be excluded from the invention.

e. Terminal Groups

It is understood that the disclosed prepolymers can have terminal groups resulting from the initiation and termination of the polymerization reaction used to prepare the prepolymer. For example, a prepolymer can have a terminal group resulting from the initiation reaction and having a structure represented by a formula:

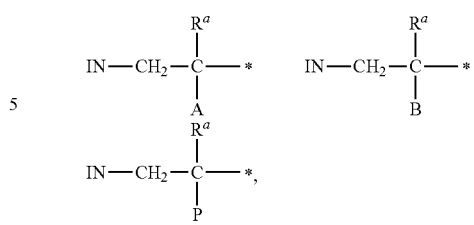

wherein A, B, and P represent a siloxanyl group, a hydrophilic group, and a polymerizable group, as described herein. In the above structures, the symbol IN represents a residue of an initiator, for example, an azo initiator or a peroxide initiator.

A prepolymer can also have a terminal group resulting from the termination reaction and having a structure represented by a formula:

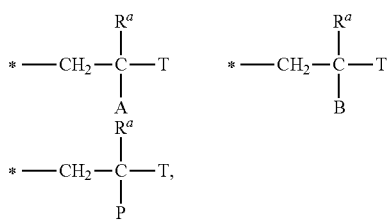

wherein A, B, and P represent a siloxanyl group, a hydrophilic group, and a polymerizable group, as described herein. In the above structures, the symbol T represents a residue of a terminator, for example, a hydrogen atom extracted from water or other protic solvent.

It is also understood that the disclosed prepolymers can have analogous terminal groups resulting from analogous initiation and termination reactions with comonomers.

It is understood that any one or more of the disclosed aspects, examples, or species can optionally be excluded from the invention.

2. Silicon Content

In one aspect, a disclosed prepolymer can have a silicon content of from about 10% to about 30% by weight. In a further aspect, a disclosed prepolymer can have a silicon content of from about 13% to about 20% by weight. For example, the silicon content can be from about 15% to about 20%, from about 13% to about 18%, from about 15% to about 18%, about 13%, about 15%, about 18%, or about 20%. It is also understood that a disclosed silicon content can represent the average silicon content for a collection of silicone prepolymers.

In a further aspect, the total of the polar silicone units can be from about 50% to about 80% by weight, based on solid content of the prepolymer. For example, the total of the polar silicone units can be from about 55% to about 80%, from about 60% to about 80%, from about 50% to about 75%, from about 50% to about 70%, from about 60% to about 70%, or from about 55% to about 75%. It is also understood that a disclosed total of the polar silicone units can represent the average total for a collection of silicone prepolymers.

In a further aspect, the content of the polymerizable unit can be from about 0.1 to about 15 mol %, based on the prepolymer. For example, the content of the polymerizable unit can be from about 0.25 mol % to about 15 mol %, from about 0.5 mol % to about 15 mol %, from about 1 mol % to about 15 mol %, from about 0.1 mol % to about 12 mol %, from about 0.1 mol % to about 10 mol %, from about 0.1 mol % to about 5 mol %, or from about 0.1 mol % to about 10 mol %. It is also understood that a disclosed content of the polymerizable unit can represent the average content of the polymerizable unit for a collection of silicone prepolymers.

It is understood that any one or more of the disclosed aspects, examples, or species can optionally be excluded from the invention.

3. Solubility

In one aspect, the disclosed prepolymers exhibit superior solubility in aqueous solutions or hydrophilic solutions, such as e.g. PEG/PVP. Solubility can be determined by solubility tests in which a sample of the prepolymer is stored in a number of different solvents. By observing whether the polymer is dissolved, swelled, or unchanged, it is possible to ascertain whether and to what extent a prepolymer is soluble in a given solvent system. See Hansen Solubility Parameters; A User's Handbook, Charles M. Hansen, pp. 43-53, CRC Press 2000. For example, a known mass of prepolymer can be exposed to an excess amount of a given solvent system for a period of time (e.g., 10 minutes). The mixture can be optionally sonicated and/or exposed to elevated temperature. Afterwards, any undissolved prepolymer can be removed by decantation or by filtration, and the proportion dissolved within the solvent system can be calculated.

Solubility can be determined by using a protocol of the following example (note that wt % is an example for 60 wt % solid solution): (1) Irgacure 819 (a photo-initiator, 0.42 wt %) and a prepolymer (55.38 wt %) are added into PEG (40 wt %)/PVP (4.2 wt %) solution. (2) The mixture is mixed well with a touch mixer and by sonication. (3) The mixture is put in an oven at 70° C. for about one hour. (4) The mixture removed from the oven and mixed with a spatula. (5) The mixture is put in the oven again for another 40 minutes. (6) Repeat steps 4 and 5. (7) If the mixture is clear and phase separation is not observed when the mixture is taken out from the oven, it is considered "soluble." If the mixture is hazy or phase separation is observed, it is considered "insoluble."

In one aspect, a prepolymer can have a solubility of not less than about 50% by weight, based on solid content of the prepolymer, in a water-soluble solvent. For example, the solubility can be at least about 55%, at least about 60%, at least about 65%, at least about 70%, at least about 75%, at least about 80%, at least about 85%, or at least about 90%. It is understood that, in one aspect, the solubility can be affected by the average molecular weight of the prepolymer composition. That is, prepolymer having a certain molecular weight or less can be soluble, while prepolymer having a certain molecular weight or more can be less soluble.

In one aspect, prepolymer can have a solubility of not less than about 50% by weight (e.g., at least about 55%, at least about 60%, at least about 65%, at least about 70%, at least about 75%, at least about 80%, at least about 85%, or at least about 90%), based on solid content of the prepolymer, in a water-soluble solvent comprising from about 1% to about 20% (e.g., from about 1% to about 5%, from about 5% to about 10%, from about 2% to about 8%, about 2%, about 3%, about 4%, about 5%, about 6%, about 7%, about 8%, or about 9%) by weight of polyvinylpyrrolidone.

Solvent systems suitable for use with the disclosed prepolymers include the disclosed solvents. Further suitable co-solvents include water-soluble solvents such as ethylene glycol, propylene glycol, polyethylene glycol, polypropylene glycol, ethylene glycol-propylene glycol copolymer, and mixtures thereof.

4. Molecular Weight

In one aspect, the disclosed prepolymers can have an average molecular weight of from about 10 kD to about 1000 kD, for example from about 10 kD to about 500 kD, from about 10 kD to about 300 kD, or from about 10 kD to about 200 kD. In one aspect, the polydispersity ($M_w/M_n$) of the disclosed prepolymers can be from about 1.00 to about 10.00. For example, the polydispersity can be from about 1.00 to about 9.00, from about 1.00 to about 8.00, from about 1.00 to about 7.00, from about 1.00 to about 6.00, or from about 1.00 to about 5.00. In a further aspect, the polydispersity can be less than about 8, for example, less than about 7.5, less than about 7, less than about 6.5, less than about 6, less than about 5.5, less than about 5, less than about 4.5, or less than about 4.

5. Comonomers

It is also contemplated that the disclosed prepolymers can further comprise residues from further comonomers, so long as the prepolymer retains a silicon content of from about 10% to about 30% by weight, of the prepolymer and a polar silicone-containing residue content of from about 30% to about 90% by weight of the prepolymer. Preferred examples of such comonomers include alkyl(meth)acrylates such as (meth)acrylic acid, itaconic acid, crotonic acid, cinnamic acid, vinylbenzoic acid, methyl(meth)acrylate and ethyl(meth)acrylate; polyfunctional (meth)acrylates such as polyalkylene glycol mono(meth)acrylate, polyalkylene glycol monoalkyl ether(meth)acrylate, polyalkylene glycol bis(meth)acrylate, trimethylolpropane tris(meth)acrylate, pentaerythritol tetrakis(meth)acrylate, polydimethyl siloxane having (meth)acryloxypropyl group at both ends, polydimethyl siloxane having (meth)acryloxypropyl group at one end and polydimethyl siloxane having a plurality of (meth)acryloyl groups in side chains; halogenated alkyl(meth)acrylates such as trifluoroethyl(meth)acrylate and hexafluoroisopropyl (meth)acrylate; hydroxyalkyl(meth)acrylates having hydroxyl group such as 2-hydroxyethyl(meth)acrylate, 2-hydroxypropyl(meth)acrylate and 2,3-dihydroxypropyl(meth)acrylate; (meth)acrylamides such as N,N-dimethylacrylamide, N,N-diethylacrylamide, N,N-di-n-propylacrylamide, N,N-diisopropylacrylamide, N,N-di-n-butylacrylamide, N-acryloylmorpholine, N-acryloylpiperidine, N-acryloylpyrrolidine and N-methyl(meth)acrylamide; N-vinyl-N-methyl acetamide, N-vinyl-N-ethyl acetamide, N-vinyl-N-ethyl formamide, N-vinyl formamide, aromatic vinyl monomers such as styrene, α-methylstyrene and vinylpyridine; maleimides; heterocyclic vinyl monomers such as N-vinylpyrrolidone; 3-[tris(trimethylsiloxy)silyl]propyl(meth)acrylate, 3-[bis(trimethylsiloxy)methylsilyl]propyl(meth)acrylate, 3-[(trimethylsiloxy)dimethylsilyl]propyl(meth)acrylate, 3-[tris(trimethylsiloxy)silyl]propyl(meth)acrylamide, 3-[bis(trimethylsiloxy)methylsilyl]propyl(meth)acrylamide, 3-[(trimethylsiloxy)dimethylsilyl]propyl(meth)acrylamide, [tris(trimethylsiloxy)silyl]methyl(meth)acrylate, [bis(trimethylsiloxy)methylsilyl]methyl(meth)acrylate, [(trimethylsiloxy)dimethylsilyl]methyl(meth)acrylate, [tris(trimethylsiloxy)silyl]methyl(meth)acrylamide, [bis(trimethylsiloxy)methylsilyl]methyl(meth)acrylamide, [(trimethylsiloxy)dimethylsilyl]methyl(meth)acrylamide, [tris(trimethylsiloxy)silyl]styrene, [bis(trimethylsiloxy)methylsilyl]styrene, [(trimethylsiloxy)dimethylsilyl]styrene, polydimethyl siloxane having (meth)acryloxypropyl group at one end, and compounds represented by Formula (C1-1) to (C6-1) and (C1-2) to (C6-2) below.

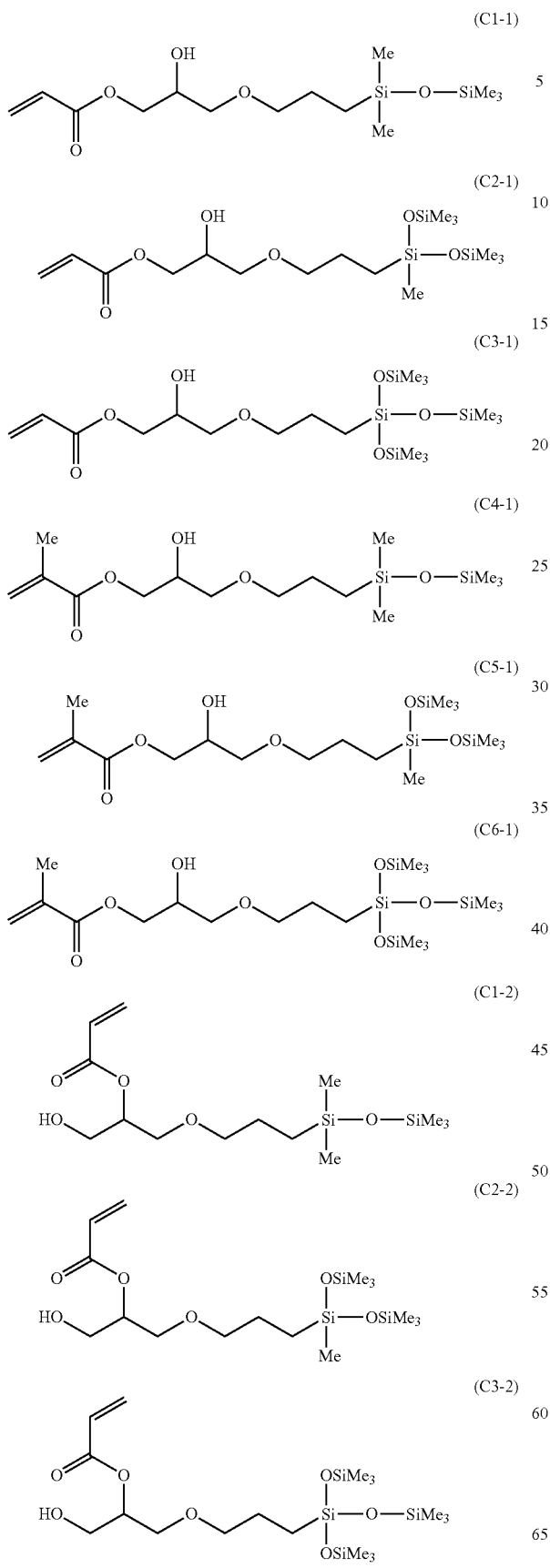
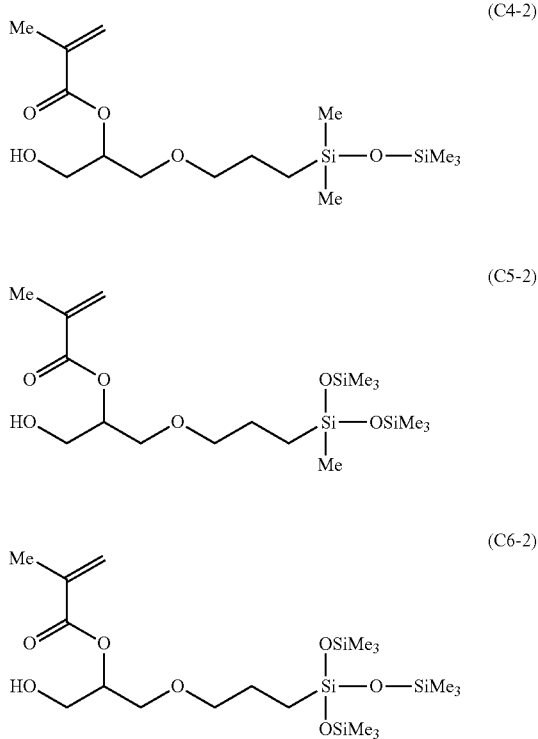

Other silicone containing components suitable for use in this invention include those described is WO 96/31792 such as macromers containing polysiloxane, polyalkylene ether, diisocyanate, polyfluorinated hydrocarbon, polyfluorinated ether and polysaccharide groups. U.S. Pat. Nos. 5,321,108; 5,387,662; and 5,539,016 describe polysiloxanes with a polar fluorinated graft or side group having a hydrogen atom attached to a terminal difluoro-substituted carbon atom. US 2002/0016383 describe hydrophilic siloxanyl methacrylates containing ether and siloxanyl linkages and crosslinkable monomers containing polyether and polysiloxanyl groups.

In one embodiment comonomers include (meth)acrylic acid, 2-hydroxyethyl(meth)acrylate, 2-hydroxypropyl(meth)acrylate, N,N-dimethylacrylamide, N-vinyl pyrrolidone, N-vinyl-N-methyl acetamide, N-vinyl-N-ethyl acetamide, 3-[tris(trimethylsiloxy)silyl]propyl(meth)acrylate, 3-[bis(trimethylsiloxy)methylsilyl]propyl(meth)acrylate, the compounds C1-1, C2-1, C3-1, C4-1, C5-1, C6-1, C1-2, C2-2, C3-2, C4-2, C5-2, C6-2, polysiloxane macromers, hydrophilic siloxyanly methacrlyates containing ether and siloxanyl linkages and combinations thereof and the like.

Further preferred examples of such monomers include 2-propenoic acid, 2-methyl-2-hydroxy-3-[3-[1,3,3,3-tetramethyl-1-[(trimethylsilyl)oxy]disiloxanyl]propoxy]propyl ester (SiGMA); monomethacryloxypropyl-terminated mono-n-butyl terminated polydimethylsiloxane (mPDMS; MW 800-1000 ($M_n$)); bis-3-acryloxy-2-hydroxypropyloxypropyl polydimethylsiloxane (acPDMS) (MW 1000 and 2000, acrylated polydimethylsiloxane from Gelest and Degussa, respectively); methacryloxypropyl-terminated polydimethylsiloxane (MW 550-700) from Gelest (maPDMS); and mono-(3-methacryloxy-2-hydroxypropyloxy) propyl terminated, mono-butyl terminated polydimethylsiloxane (mPDMS-OH).

F. Methods of Making Prepolymers

In one aspect, the invention relates to a method of preparing a prepolymer. It is understood that the compounds, structures, and moieties disclosed in connection with the prepolymers can also be used in connection with the disclosed methods.

In one aspect, the disclosed prepolymers can be prepared by a method comprising the steps of providing a mixture comprising at least one monomer having a siloxanyl group, wherein at least one of the at least one monomer having a siloxanyl group is a polar silicone-containing monomer further comprising at least one polar moiety; at least one monomer having a polymerizable group; optionally, at least one comonomer (e.g., HEMA); and, optionally, at least one monomer having a hydrophilic group; reacting the monomers by heating the mixture at a reaction temperature (e.g., from about 50° C. to about 60° C.) for a reaction time (e.g., from about 2 hours to about 6 hours), and/or exposing the mixture to a radical initiator (e.g., 2,2'-azobis(2,4-dimethylvaleronitrile)), thereby polymerizing the monomers to provide an unfunctionalized intermediate polymer; combining the unfunctionalized intermediate polymer with a reactive compound (e.g., 2-isocyanate ethyl methacrylate) bearing an ethylenically unsaturated moiety (e.g., an acryloyl moiety); optionally, a polymerization inhibitor (e.g., 2,6-di-t-butyl-4-methylphenol); and, optionally, a catalyst (e.g., dibutyltindilauric acid); allowing the reactive compound to functionalize the unfunctionalized intermediate polymer, thereby providing a prepolymer, wherein the relative proportion of monomers in the mixture are selected to provide a prepolymer with a silicon content of from about 10% to about 30% by weight, of the prepolymer and a polar silicone-containing residue content of from about 30% to about 90% by weight of the prepolymer. In a further aspect, the at least one monomer having a siloxanyl group, and the at least one monomer having a polymerizable group can be the same monomer.

In a further aspect, the disclosed prepolymers can be prepared by a method comprising the steps of providing a mixture comprising at least one monomer having a siloxanyl group, wherein at least one of the at least one monomer having a siloxanyl group is a polar silicone-containing monomer further comprising at least one polar moiety; at least one monomer having a polymerizable group (e.g., vinyl methacrylate, which has two polymerizable groups having different polymerizabilities); optionally, at least one comonomer (e.g., HEMA); and, optionally, at least one monomer having a hydrophilic group; reacting the monomers by heating the mixture at a reaction temperature (e.g., from about 50° C. to about 60° C.) for a reaction time (e.g., from about 2 hours to about 6 hours), and/or exposing the mixture to a radical initiator (e.g., 2,2'-azobis(2,4-dimethylvaleronitrile)), thereby providing a prepolymer, wherein the relative proportion of monomers in the mixture are selected to provide a prepolymer with a silicon content of from about 10% to about 30% by weight, of the prepolymer and a polar silicone-containing residue content of from about 30% to about 90% by weight of the prepolymer.

It is understood that solvent can be removed (e.g., by evaporation) after production of the intermediate polymer and/or after production of the prepolymer. It is also understood that either or both of the intermediate polymer and the prepolymer can be purified by, for example, washing, filtration, and/or distillation. Purification can be accomplished by, for example, conventional distillation or by reduced pressure distillation (e.g., thin film distillation), optionally in the presence of a polymerization inhibitor, for example, one or more of an alkylhydroquinone or a hydroxynaphthalene. That is, in a further aspect, the disclosed prepolymers can be purified by removing lower molecular weight impurities by distillation, for example, reduced pressure distillation. Such a purification method can comprise the steps of: (1) providing a prepolymer mixture or a crude prepolymer, and (2) reduced pressure distillation of lower molecular weight impurities from the prepolymer mixture or the crude prepolymer in the presence of at least one polymerization inhibitor comprising an alkylhydroquinone or a hydroxynaphthalene. In a further aspect, the method further comprises the step of collecting the distilled siloxanyl monomer. The monomer can be collected, for example, in a receiving vessel. In one aspect, the polymerization inhibitor can comprise one or more of an alkylhydroquinone or a hydroxynaphthalene.

Typically, after the intermediate polymer or prepolymer has been formed, substantially all unreacted reactants and byproducts are removed. By "substantially all," it is meant that less than about 0.1 weight % remains after purification. This can be done by conventional means, such as ultrafiltration. However, it is possible to purify the intermediate polymer or prepolymer by swelling with water and rinsing with water to remove substantially all of the undesired constituents including monomeric, oligomeric, or polymeric starting compounds and catalysts used in the preparation and byproducts formed during the preparation of the intermediate polymer or prepolymer. The washing can be conducted with deionized water and conditions can be selected to provide a large surface to volume ratio of the intermediate polymer or prepolymer particles. This can be done by freeze drying the intermediate polymer or prepolymer, making a thin film from the intermediate polymer or prepolymer, extruding the intermediate polymer or prepolymer into rods, nebulizing the intermediate polymer or prepolymer solution into the deionized water, and other like methods, which are known to those skilled in the art.

In a further aspect, a polymerizable residue can be obtained by reacting a unit having a structure represented by the formula:

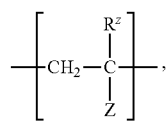

wherein $R^z$ represents hydrogen or methyl; wherein Z represents an optionally substituted $C_1$-$C_{20}$ alkyl residue or an optionally substituted $C_6$-$C_{20}$ aryl residue, which alkyl or aryl further comprises at least one of an hydroxyl group, a carboxyl group, an ester group, or a carboxylic anhydride group; with at least one compound having at least one polymerizable residue.

G. Polymers, Compositions, and Applications Thereof

In one aspect, the prepolymers can be used to prepare further polymers by, for example, a thermally-initiated or photo-initiated polymerization or crosslinking reaction. Accordingly, in a further aspect, the invention relates to a polymer obtained by polymerizing or cross-linking one or more of the disclosed prepolymers. That is, in one aspect, the invention relates to methods for producing a polymer comprising the step of polymerizing prepolymer from the disclosed compositions, thereby providing the polymer.

Additionally, the disclosed polymers can be used to prepare medical devices, such as ophthalmic lenses, for example contact lenses, intraocular implants, and artificial cornea; stents, implants, and catheters; and other optical devices. Accordingly, in a further aspect, the invention relates to an ophthalmic lens, contact lens, intraocular implant, artificial cornea, stent, implant, catheter; or other optical device obtained by polymerizing or cross-linking one or more of the disclosed prepolymers.

The present invention provides a material from which molded plastics having a desirable oxygen permeability, hydrophilicity and resistance to breakage may be produced by polymerizing the material. The molded plastics are useful as drug adsorbents used for drug delivery, and ophthalmic lenses such as contact lenses, intraocular lenses, artificial cornea and spectacle lenses. Among these, they are particularly suited for contact lenses.

In one aspect, the compositions can provide materials for producing molded plastics, which material is excellent in compatibility with hydrophilic monomers such as 2-hydroxyethyl methacrylate, which is capable of yielding molded plastics, by polymerizing the material to form articles having a desirable combination of properties, including oxygen permeability, hydrophilicity, and a low modulus of elasticity, as well as excellent optical quality.

By the present invention, a material for producing molded plastics may be provided, which material is excellent in compatibility with hydrophilic monomers such as, but not limited to 2-hydroxyethyl methacrylate, N-vinyl pyrrolidone, N,N-dimethylacrylamide, N-vinyl-N-methyl acetamide combinations thereof and the like which is capable of yielding molded plastics, by polymerizing the material, having a desirable combination of properties, including, oxygen permeability, hydrophilicity and a low modulus of elasticity, as well as excellent optical quality.

1. Molded Articles

In one aspect, the compounds and compositions of the invention can be used to provide a molded article comprising at least one of the compositions of the invention. In a further aspect, the compounds and compositions of the invention can be used to provide an ophthalmic lens comprising at least one of the compositions of the invention. In a yet further aspect, the compounds and compositions of the invention can be used to provide a contact lens comprising at least one of the compositions of the invention.

Molded articles, e.g. contact lenses, can be prepared by further polymerizing or crosslinking the disclosed prepolymers, either alone or with one or more other of the comonomers or materials described herein. For preparing the molded articles, especially ophthalmic lenses, additional materials may also be included in the polymerization mixture. For example, a crosslinker having two or more polymerizable carbon-carbon unsaturated bonds in the molecule can be included to obtain good mechanical properties and good resistance to antiseptic solutions and washing solutions. The percentage of the crosslinker, based on the total monomers to be copolymerized, is preferably not less than about 0.01% by weight, more between about 0.05% and about 15% by weight, still more preferably between about 0.1% and about 5% by weight. In certain aspects, because the disclosed prepolymers comprise polymerizable moieties, additional crosslinker may be omitted.

From the viewpoint of simultaneously attaining a desired oxygen permeability and hydrophilicity, the percentage of the material for producing molded plastics according to the present invention in the prepared molded plastics is, in cases where other siloxanyl-group containing polymerizable material is not copolymerized, preferably from about 30% by weight to about 100% by weight, more preferably from about 50% by weight to about 99% by weight, still more preferably from about 60% by weight to about 95% by weight. In cases where one or more other siloxanyl group-containing polymerizable materials are copolymerized, the percentage of the total of the material according to the present invention and the other siloxanyl group-containing polymerizable material(s) in the prepared molded plastics is preferably from about 30% by weight to about 100% by weight, more preferably from about 50% by weight to about 99% by weight, still more preferably from about 60% by weight to about 95% by weight.

2. Additives

The molded plastics may contain additional components, including, but not limited to UV absorbers, colorants, coloring agents, wetting agents, slip agents, pharmaceutical and nutraceutical components, compatibilizing components, antimicrobial compounds, release agents, combinations thereof and the like. Any of the foregoing may be incorporated in non-reactive, polymerizable, and/or copolymerized form.

3. Polymerization Procedures

In the polymerization or crosslinking for preparing molded articles, it is preferred to add a thermal polymerization initiator or photopolymerization initiator typified by peroxides and azo compounds for easily attaining polymerization. In cases where thermal polymerization is carried out, one having the optimum decomposition characteristics at the satisfactory reaction temperature is selected. In general, azo initiators and peroxide initiators having a 10 hour half-life temperature of from about 40° C. to about 120° C. are preferred. Examples of the photoinitiator include carbonyl compounds, peroxides, azo compounds, sulfur compounds, halogenated compounds and metal salts. These polymerization initiators can be used individually or in combination. The amount of the polymerization initiator(s) can be up to about 1% by weight based on the polymerization mixture.

In (co)polymerizing the material for producing molded plastics according to the present invention, a polymerization solvent can be used. As the solvent, various organic and inorganic solvents can be employed. Examples of the solvents include water; alcoholic solvents such as methyl alcohol, ethyl alcohol, normal propyl alcohol, isopropyl alcohol, normal butyl alcohol, isobutyl alcohol, tert-butyl alcohol, ethylene glycol, diethylene glycol, triethylene glycol, tetraethylene glycol and polyethylene glycol; glycol ether solvents such as methyl cellosolve, ethyl cellosolve, isopropyl cellosolve, butyl cellosolve, propylene glycol monomethyl ether, diethylene glycol monomethyl ether, triethylene glycol monomethyl ether, polyethylene glycol monomethyl ether, ethylene glycol dimethyl ether, diethylene glycol dimethyl ether, triethylene glycol dimethyl ether and polyethylene glycol dimethyl ether; ester solvents such as ethyl acetate, butyl acetate, amyl acetate, ethyl lactate and methyl benzoate; aliphatic hydrocarbon solvents such as normal hexane, normal heptane and normal octane; alicyclic hydrocarbon solvents such as cyclohexane and ethylcyclohexane; ketone solvents such as acetone, methyl ethyl ketone and methyl isobutyl ketone; aromatic hydrocarbon solvents such as benzene, toluene and xylene; and petroleum solvents. These solvents can be used individually or two or more of these solvents can be used in combination.

4. Molding Procedures

As the method of polymerization of the material for producing molded articles according to the present invention, and as the method of molding the plastics, known methods can be employed. For example, a method in which the material is once polymerized and molded into the shape of round bar or plate and the resulting round bar or plate is then processed into the satisfactory shape by cutting or the like, mold polymerization method and spin cast polymerization method can be employed.

As an example, a process for producing an ophthalmic lens from the disclosed prepolymers will now be described. First, a gap having a prescribed shape, between two mold parts, is filled with a prepolymer composition and photopolymerization or thermal polymerization is carried out to shape the composition into the shape of the gap between the molds. The molds are made of a resin, glass, ceramics, metal, or the like. In case of photopolymerization, an optically transparent material is used, and a resin or glass is usually used. In case of producing an ophthalmic lens, a gap is formed between two mold parts facing each other, and the gap is filled with the material composition. Depending on the shape of the gap and on the properties of the material composition, a gasket may be used in order to give the ophthalmic lens a prescribed thickness and to prevent leakage of the material composition filled in the gap. The molds containing the gap filled with the material composition are then irradiated with an actinic radiation such as ultraviolet light, visible light or a combination thereof, or placed in an oven or bath to heat the material composition, thereby carrying out polymerization. The two polymerization methods may be employed in combination, that is, thermal polymerization may be carried out after photopolymerization, or photopolymerization may be carried out after thermal polymerization. In photopolymerization embodiment, a light containing ultraviolet light, such as the light from a mercury lamp or UV lamp (e.g., FL15BL, TOSHIBA corporation) is radiated for a short time (usually not longer than 1 hour). In cases where thermal polymerization is carried out, it is preferred to employ conditions in which the composition is slowly heated from room temperature to a temperature from about 60° C. to about 200° C. over a period of several hours to several tens hours, in view of the optical uniformity, high quality, and high reproducibility of the ophthalmic lens.

The molded articles produced from the disclosed prepolymer can have a dynamic contact angle (during forward movement, immersion rate: about 0.1 mm/sec) of, for example, not more than about 130°, more preferably not more than about 120°, still more preferably not more than about 100°. The water content thereof is preferably from about 3% to about 50%, more preferably from about 5% to about 50%, still more preferably from about 7% to about 50%.

Generally, for contact lenses, higher oxygen permeabilities are desirable. In one aspect, the oxygen permeability coefficient $[\times 10^{-11}(cm^2/sec)mLO_2/(mL \cdot hPa)]$ is preferably not less than about 50, more preferably not less than about 60, still more preferably not less than about 65. In certain aspects, the oxygen permeability coefficient can be at least about 90, at least about 95, at least about 100, at least about 105, or at least about 110. The tensile modulus of elasticity is preferably from about 0.01 to about 30 MPa, more preferably from about 0.1 to about 7 MPa. The tensile elongation is preferably not less than about 50%, more preferably not less than about 100%. Since a higher tensile elongation gives higher resistance to breakage, it is preferred that the molded plastics have a high tensile elongation. These properties may be measured using the test methods disclosed in WO03/022321.

H. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Analytical Methods

Molecular weight: size exclusion chromatography (SEC) equipment is composed of a column oven at 40° C., a PE LC-410 pump with PE Nelson 900A/D and a series 200 autosampler. The detector can be a RI Merck L7490. The column combination can consist of two TSK-Gel columns from TosoHaas (G4000PW+G2500PW) and a guardcolumn. The eluent can be made with methanol-water (75/25 wt/wt) and adjusted to 50 mM sodium chloride (NaCl). The flow rate can be 0.5 mL/minute. The injection volume is 150 µL and the run time can be 60 minutes. A calibration curve can be obtained with third order regression using PEG and PEO of Peak molecular weights ranging from 960000 to 194 as standard references. These polymer standards can be purchased from Polymer Laboratories Inc, Amherst Mass. (Calibration kits PEG-10 part No 2070-0100; PEO-10 part No 2080-0101). Added standard reference PEG of Peak molecular weight of 194 gives a flow signal at a well-defined position, which can be used as an internal standard or fixation point. Added NaCl can play the same role and gives a second fixation point. Peak integrations can be made manually. Integration start and end points can be manually determined from significant difference on global baseline. The injection solutions can be prepared with methanol-water 75/25 wt/wt adjusted to 60 mM NaCl to give a polymer concentration of 2 mg/mL. Tetraethylene glycol can be added to the sample in a concentration of 1 mg/ml in order to give a peak flow reference. The solutions are filtered on 0.5 µm disposable filters before the injection is performed. Polydispersity, $P_d$, of a polymer sample can be defined as $P_d=M_w/M_n$. The peak molecular weight, $M_p$, is the molecular weight of the highest peak in the molecular weight distribution curve.

Figure 2:
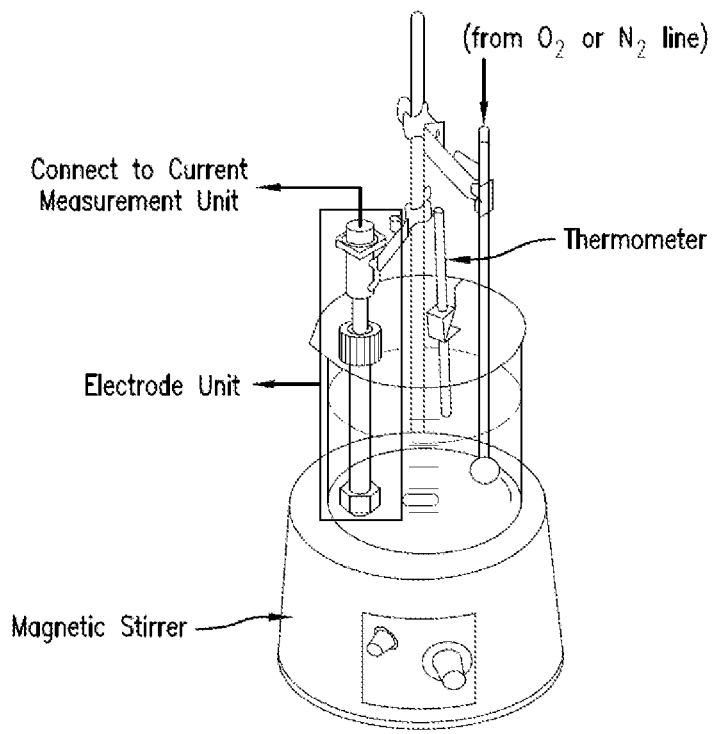
FIG. 2 shows an apparatus for oxygen permeability measurement.
Figure 3:
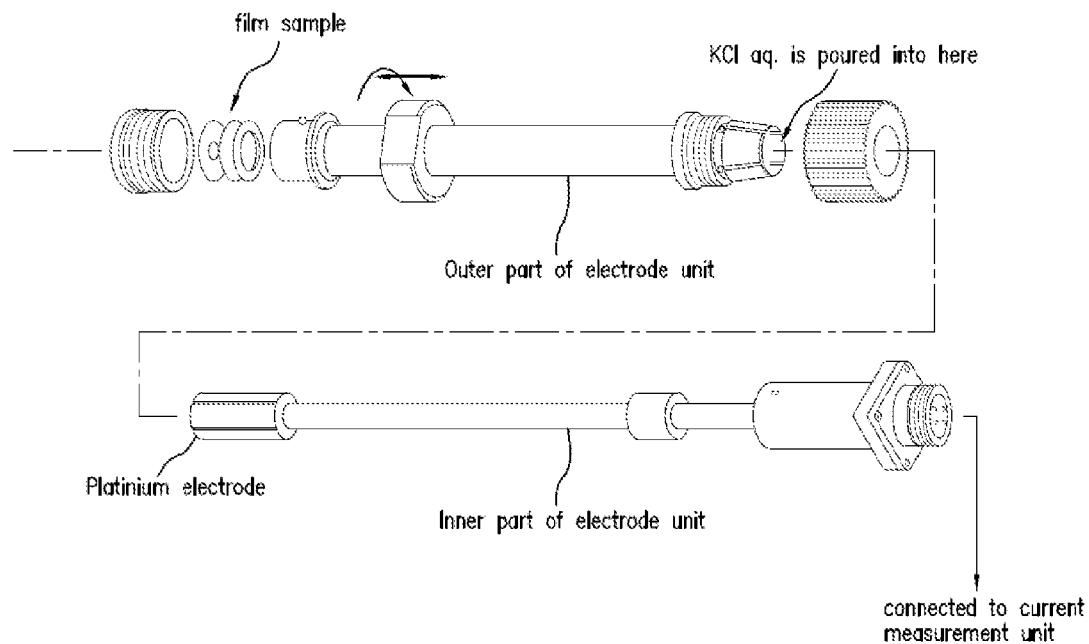
FIG. 3 shows the structure of an electrode unit used to measure oxygen permeability.
Figure 4:
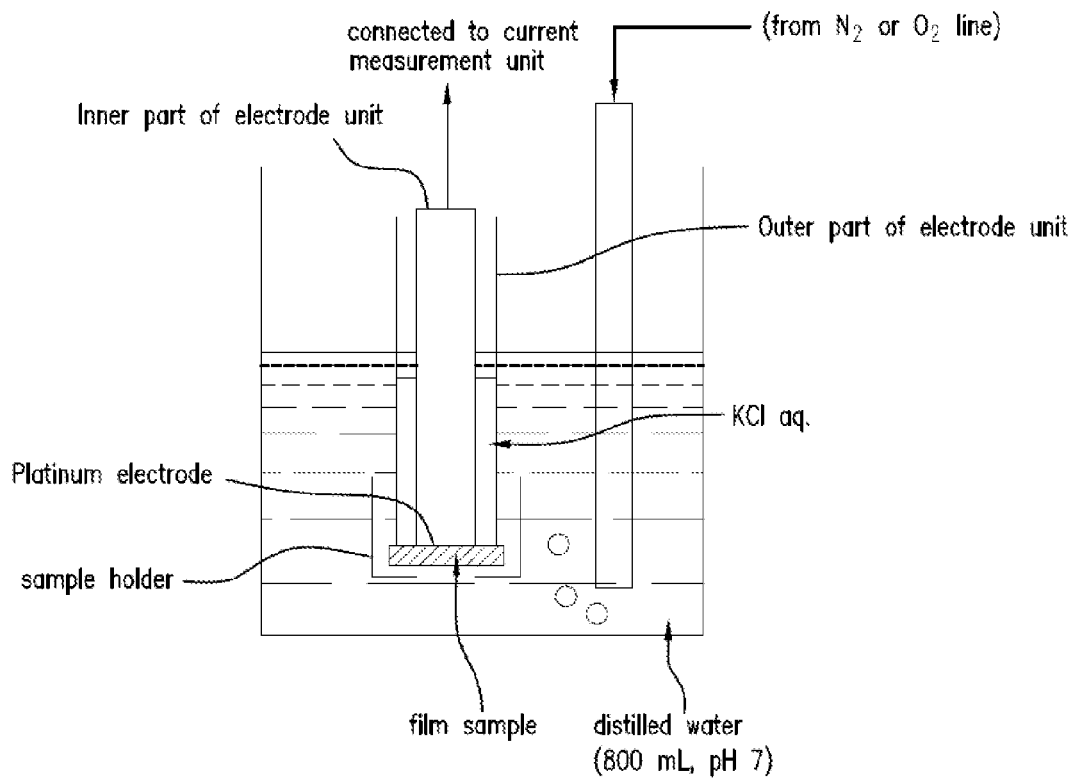
FIG. 4 shows a schematic of an oxygen permeability measurement setup.

Oxygen permeability: A sample's oxygen permeability was determined by using a Seikaken-shiki film oxygen permeability meter manufactured by RIKA SEIKI KOGYO CO., LTD. The oxygen permeability coefficient of a sample in the form of a film was measured in water at 35° C. (temperature controller not shown in Figure). Stirring was performed at a rate of 800 rpm with a 3 mm octagon-type MAGMIX magnetic stirrer (Mitamura Riken Kogyo Inc.). Four film samples with different thickness were prepared (0.1 mm, 0.2 mm, 0.3 mm, and 0.4 mm; diameter 16 mm) The four samples with different thickness were measured to determine Pm of every example (see FIG. 1); the graduation of the dial upright gauge used was 0.001 mm; with an accuracy of about +/−0.003 mm. One of the samples was set on an electrode. 0.5 N KCl (aqueous) was poured into the electrode as an electrolytic solution (see FIGS. 2-4). The electrode was set in distilled water (pH=7, volume=800 ml). At first, the current under nitrogen bubbling (flow rate=100 mL/min.; electric current, i, is measured after it is in equilibrium) was measured in order to adjust zero. Then the current under oxygen bubbling was measured. R was calculated by the following formula: $R=(Ps \times N \times F \times A)/i$ [$cm^2$ sec mmHg/mL (STP)] (wherein Ps=760 mmHg (atmospheric pressure), N=4 (the number of electrons which involves a reaction at the electrode), F=96500 coulomb/mol (Faraday constant), A=area of the electrode (cm$^2$), i=measured current (uA)). R involves constant (not proportional) part, so plural measurement and plotting are necessary to determine Pm (see FIG. 1). R versus the thickness of the samples was plotted. The inverse of the slope is the oxygen permeability coefficient (Pm).

In oxygen permeability testing, edge correction is typically considered when the area of a material through which oxygen passes differs from one surface of the sample to the other surface. In the present measurement method, the area of the hole of the ring which is set next to a film sample (see FIG. 3, upper left portion) is the same as the area of platinum electrode, so edge correction is unnecessary.

Moisture Content: a sample in the form of a film sizing about 10 mm×10 mm×0.2 mm was used. The sample was dried in a vacuum dryer at 40° C. for 16 hours, and the weight (Wd) of the sample was measured. Thereafter, the resulting sample was immersed in pure water at 40° C. in a thermostat bath overnight or more, and the moisture on the surface was wiped with Kimwipe, followed by measurement of the weight (Ww). The moisture content was calculated according to the following equation:

Moisture Content(%)=100×($Ww-Wd$)/$Ww$

Tensile Test: a sample in the form of a film sizing about 19.5 mm×15 mm×0.2 mm was used. The tensile modulus of elasticity was measured using Tensilon type RTM-100 manufactured by ORIENTEC. The speed of pulling was 100 mm/min and the distance between grips was 5 mm.

2. Synthesis of Silicone Prepolymer A1

To a 300 mL three-necked flask equipped with a thermometer, three way stopcock, and mechanical stirrer, 33.44 g of a silicone monomer (SiMAA) represented by the following Formula (h):

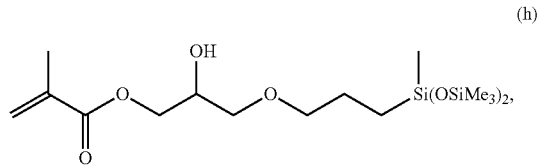

36.00 g of a silicone monomer represented by the following Formula (i):

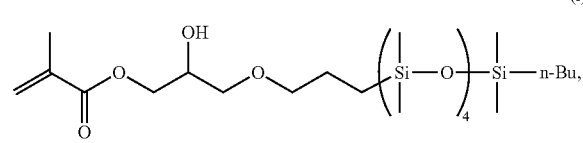

13.32 g of N,N-dimethylacrylamide (DMA), 6.12 g of 2-hydroxyethyl methacrylate (HEMA), 0.10 g of 2,2'-azobis(2,4-dimethylvaleronitrile)(ADVN), 2.04 g of 2-(2'-hydroxy-5'-methacryloxyethylphenyl)-2H-benzotriazole (UV absorber), 0.0204 g of a dye represented by the following Formula (r):

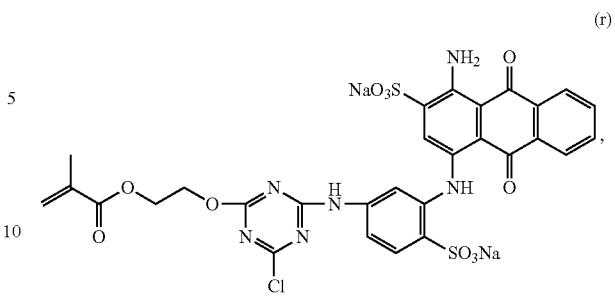

1.00 g of 1-dodecylmercaptan (DSH), and 93.00 g of t-amyl alcohol (TAA) were added, and the atmosphere was replaced with argon. The mixture was stirred under argon atmosphere at 50° C. for 0.5 hours and then at 60° C. for 4.5 hours, thereby polymerizing the monomers. After completion of the reaction, the solvent was evaporated with an evaporator. The obtained solids were dissolved in 150 mL of methanol under heat, and the resulting solution was added to 300 mL of 40% (v/v) aqueous methanol solution under stirring. The resulting mixture was left to stand, and the supernatant was removed. The obtained precipitate was washed once with 300 mL of 65% (v/v) aqueous methanol solution and once with 300 mL of 75% (v/v) aqueous methanol solution. The obtained solids were dried under vacuum at 40° C. for 18 hours and then pulverized after adding liquid nitrogen, followed by drying at 40° C. for 3 hours to obtain an unfunctionalized polymer.

To a 300 mL four-necked flask, 65 g of the obtained unfunctionalized polymer, 69 mg of 2,6-di-t-butyl-4-methylphenol (BHT), and 220 g of 1,4-dioxane were added, and a mechanical stirrer, a connecting tubule connected to a nitrogen line, and a Claisen tube were mounted, and a Liebig condenser, siphon and eggplant type flask were connected to the tip of the Claisen tube. The temperature was raised to 110° C. while stirring the mixture under nitrogen gas flow, and the temperature of 110° C. was kept until about 110 g of 1,4-dioxane was evaporated, thereby eliminating moisture from the reaction system. After cooling the mixture to 60° C., 30 μL of dibutyltindilauric acid (DBTDL) and 1.27 g of 2-isocyanate ethyl methacrylate (MOI) were added under nitrogen gas flow, and the resulting mixture was allowed to react at 60° C. for 3 hours. After completion of the reaction, 50 mL of methanol was added, and the mixture was stirred for 15 minutes. The reaction solution was concentrated in an evaporator at 50° C., and 100 mL of methanol was added to the obtained concentrate to form a uniform solution. The resulting solution was added to 300 mL of 70% (v/v) aqueous methanol solution under stirring, and the mixture was left to stand, followed by removal of the supernatant. The precipitate was further washed twice with 300 mL of 85% (v/v) aqueous methanol solution. The obtained solids were dried under vacuum at 40° C. for 18 hours, and then pulverized after adding liquid nitrogen, followed by drying at 40° C. for 3 hours to obtain the desired silicone polymer.

3. Example A1

To 3.20 g of a solution containing 0.30 g of polyvinylpyrrolidone K90 and 0.03 g of Irgacure 819 (CIBA specialty chemicals) dissolved in 2.87 g of mono n-butyl poly(ethylene glycol-propylene glycol) random copolymer (average molecular weight: 200), 3.97 g of the silicone prepolymer A1 was added, and the materials were mixed under heat at 70° C., followed by reducing the pressure to carry out degassing. The solubility was visually observed, and the results are shown in Table 2.

The obtained silicone prepolymer solution was deoxygenated under argon atmosphere and poured onto a glass plate with thin film (0.8 um thickness) in its peripheral area, under nitrogen (oxygen<0.5%), in a glove box at 55° C. The silicone prepolymer solution was covered with another glass plate and irradiated with light (1.6 mW/cm², 10 minutes) with a fluorescent lamp (lamda max: 420 nm) to polymerize the prepolymer. After polymerization, the two glass plates were separated and sonicated in borate buffer (pH 7.4 to 7.6) to demold the polymer film. The film was sterilized at 121° C. for 30 minutes, thereby obtaining a film sample. The transparencies of the film sample are shown in Table 2.

4. Comparative Examples A1 to A6

The same operations as in Example A1 were repeated except that the solvent of polymerization was changed as shown in Table 2. The transparency of the polymerization mixture and that of the film sample were shown in Table 2.

methacryloxyethylphenyl)-2H-benzotriazole (UV absorber), 0.0612 g of a dye represented by the following Formula (r):

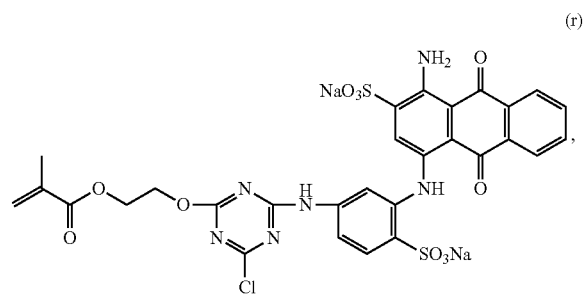

(r)

2.232 g of 1-dodecylmercaptan (DSH), and 279.24 g of t-amyl alcohol (TAA) were added, and the atmosphere was

TABLE 2

| | solvent | molecular weight | terminal groups ($R^{11}$, $R^{13}$) | polymerization mixture | film |
|---|---|---|---|---|---|
| Example A1 | poly(EG + PG) random copolymer (50:50) mono(n-butyl) ether | 200 | (n-Bu, H) | clear solution | transparent |
| Comparative Example A1 | PEG | 200 | (H, H) | clear solution | not transparent |
| Comparative Example A2 | PPG | 200 | (H, H) | insoluble (prepolymer) | — |
| Comparative Example A3 | PEG + PPG 50:50 mixture | 200, 200 | (H, H), (H, H) | insoluble (prepolymer) | — |
| Comparative Example A4 | PEG monomethyl ether | 100 | (Me, H) | clear solution | not transparent |
| Comparative Example A5 | PEG monomethyl ether | 400 | (Me, H) | clear solution | not transparent |
| Comparative Example A6 | PEG dimethyl ether | 500 | (Me, Me) | insoluble (PVP) | — |

5. Synthesis of Silicone Prepolymer B1

To a 300 mL three-necked flask equipped with a thermometer, three way stopcock, and mechanical stirrer, 100.32 g of a silicone monomer (SiMAA) represented by the following Formula (h):

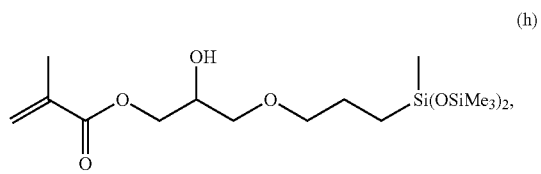

(h)

108.00 g of a silicone monomer (OH-mPDMS) represented by the following Formula (i):

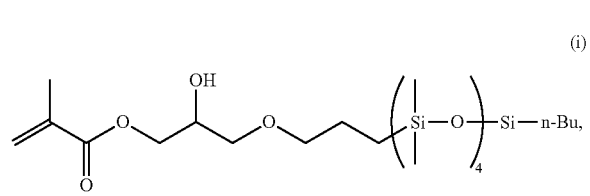

(i)

46.44 g of N,N-dimethylacrylamide (DMA), 18.36 g of 2-hydroxyethyl methacrylate (HEMA), 0.279 g of 2,2'-azobis(2,4-dimethylvaleronitrile)(ADVN), 6.12 g of 2-(2'-hydroxy-5'- replaced with argon. The mixture was stirred under argon atmosphere at 50° C. for 0.5 hours and then at 60° C. for 4.5 hours, thereby polymerizing the monomers. After completion of the reaction, the solvent was evaporated with an evaporator. The obtained solids were dissolved in 450 mL of methanol under heat, and the resulting solution was added to 900 mL of 40% (v/v) aqueous methanol solution under stirring. The resulting mixture was left to stand, and the supernatant was removed. The obtained precipitate was washed once with 900 mL of 65% (v/v) aqueous methanol solution and once with 900 mL of 75% (v/v) aqueous methanol solution. The obtained solids were dried under vacuum at 40° C. for 18 hours and then pulverized after adding liquid nitrogen, followed by drying at 40° C. for 3 hours to obtain an unfunctionalized polymer.

To a 300 mL four-necked flask, 65 g of the obtained unfunctionalized polymer, 0.01 g of 2,6-di-t-butyl-4-methylphenol (BHT) and 220 g of 1,4-dioxane were added, and a mechanical stirrer, a connecting tubule connected to a nitrogen line, and a Claisen tube were mounted, and a Liebig condenser, siphon and eggplant type flask were connected to the tip of the Claisen tube. The temperature was raised to 110° C. while stirring the mixture under nitrogen gas flow, and the temperature of 110° C. was kept until about 110 g of 1,4-dioxane was evaporated, thereby eliminating moisture from the reaction system. After cooling the mixture to 60° C., 30 μL of dibutyltindilauric acid (DBTDL) and 1.733 g of 2-isocyanate ethyl methacrylate (MOI) were added under nitrogen gas flow, and the resulting mixture was allowed to react at 60° C. for 3 hours. After completion of the reaction, 50 mL of methanol was added, and the mixture was stirred for 15 minutes. The reaction solution was concentrated in an evaporator at 50° C., and 100 mL of methanol was added to the obtained concentrate to form a uniform solution. The resulting solution was added to 300 mL of 70% (v/v) aqueous methanol solution under stirring, and the mixture was left to stand, followed by removal of the supernatant. The precipitate was further washed twice with 300 mL of 85% (v/v) aqueous methanol solution. The obtained solids were dried under vacuum at 40° C. for 18 hours and then pulverized after adding liquid nitrogen, followed by drying at 40° C. for 3 hours to obtain the desired silicone polymer.

6. Example B1

To 3.20 g of a solution containing 0.30 g of polyvinylpyrrolidone K90 and 0.03 g of Irgacure 819 (CIBA specialty chemicals) dissolved in 2.87 g of ethylene glycol mono n-butyl ether, 3.97 g of the silicone prepolymer B1 was added, and the materials were mixed under heat at 70° C., followed by reducing the pressure to carry out degassing. The solubility was visually observed, and the results are shown in Table 3.

The obtained silicone prepolymer solution was deoxygenated under argon atmosphere and poured onto a glass plate with thin film (0.8 um thickness) in its peripheral area, under nitrogen (oxygen<0.5%), in a glove box at 55° C. The silicone prepolymer solution was covered with another glass plate and irradiated with light (1.6 mW/cm$^2$, 10 minutes) with a fluorescent lamp (lamda max: 420 nm) to polymerize the prepolymer. After polymerization, two glass plates were separated and sonicated in borate buffer (pH 7.4 to 7.6) to demold the polymer film. The film was sterilized at 121° C. for 30 minutes, thereby obtaining a film sample. The transparencies of the film samples are shown in Table 3.

7. Examples B2 to B6

The same operations as in Example B1 were repeated except that the solvent of polymerization was changed as shown in Table 3. The transparency of the polymerization mixture and that of the film sample were shown in Table 3.

8. Comparative Example B1 to B4

The same operations as in Example B1 were repeated except that the solvent of the polymerization mixture was changed as shown in Table 3. The transparency of the polymerization mixture and that of the film sample were shown in Table 3.

TABLE 3

|  | Solvent | $(n+1)/(2n+m)$ | Polymerization mixture | Film sample |
| --- | --- | --- | --- | --- |
| Example B1 | Ethylene Glycol mono n-butyl ether | 0.333 | Clear solution | transparent |
| Example B2 | Ethylene Glycol mono n-hexyl ether | 0.250 | Clear solution | transparent |
| Example B3 | Diethylene Glycol mono n-butyl ether | 0.375 | Clear solution | transparent |
| Example B4 | Diethylene Glycol mono n-hexyl ether | 0.300 | Clear solution | transparent |
| Example B5 | Triethylene Glycol mono n-butyl ether | 0.400 | Clear solution | transparent |
| Example B6 | Triethylene Glycol mono i-propyl ether | 0.444 | Clear solution | transparent |
| Comparative Example B1 | Ethylene Glycol mono ethyl ether | 0.500 | Phase separation | not transparent |
| Comparative Example B2 | Diethylene Glycol mono ethyl ether | 0.500 | Phase separation | not transparent |
| Comparative Example B3 | Triethylene Glycol mono methyl ether | 0.571 | Phase separation | not transparent |
| Comparative Example B4 | Triethylene Glycol mono ethyl ether | 0.500 | Phase separation | not transparent |

9. Synthesis of Silicone Prepolymer B2 to B7

The same operations as in Example B1 were repeated except that the composition of the polymerization mixture was changed as shown in Table 4. The transparency of the polymerization mixture and that of the film sample were shown in Table 3.

TABLE 4

|  | Prepolymer B1 | Prepolymer B2 | Prepolymer B3 | Prepolymer B4 | Prepolymer B5 | Prepolymer B6 | Prepolymer B7 |
| --- | --- | --- | --- | --- | --- | --- | --- |
| SiMAA | 100.32 | — | 44.99 | — | — | 25.91 | 25.91 |
| OH-mPDMS | 108 | 65.52 | — | 62.25 | 60.25 | — | — |
| mPDMS | — | — | 22.36 | 5.26 | 8.26 | 34.42 | 34.42 |
| DMA | 46.44 | 23.69 | 20.56 | 17.58 | 17.58 | 29.99 | 24.66 |
| HEMA | 18.36 | 8.58 | 9.87 | 9.75 | 11.75 | 6.62 | 10.95 |

TABLE 4-continued

|  | Prepolymer B1 | Prepolymer B2 | Prepolymer B3 | Prepolymer B4 | Prepolymer B5 | Prepolymer B6 | Prepolymer B7 |
|---|---|---|---|---|---|---|---|
| ADVN | 0.279 | 0.1 | 0.1 | 0.097 | 0.1 | 0.101 | 0.1 |
| DSH | 2.232 | 0.4 | 0.8 | 0.776 | 0.8 | 0.808 | 0.8 |
| UV absorber | 6.12 | 2.19 | 2.19 | 2.19 | 2.19 | 2.19 | 2.19 |
| Dye | 0.0612 | 0.022 | 0.022 | 0.022 | 0.022 | 0.022 | 0.022 |
| TAA | 279.24 | 100 | 100 | 97 | 100.1 | 101 | 100 |
| unfunctionalized polymer | 65 | 80 | 80 | 80 | 80 | 80 | 80 |
| BHT | 0.01 | 0.0124 | 0.0124 | 0.0124 | 0.0124 | 0.0124 | 0.0124 |
| MOI | 1.733 | 2.132 | 2.132 | 2.132 | 2.132 | 2.132 | 2.132 |
| DBTDL | 30 | 37 | 37 | 37 | 37 | 37 | 37 |
| Si content | 16.0 | 15.0 | 16.0 | 16.4 | 16.4 | 15.8 | 16.0 |
| PSRC* | 75 | 66 | 45 | 64 | 60 | 26 | 26 |

*Polar Silicone-containing Residue Content of a prepolymer (by weight). PSRC is calculated as (the weight of polar silicone-containing monomer)/(total weight of the prepolymer) × 100.

10. Example B7 to B10

The same operations as in Example B1 were repeated except that the solvent of the polymerization mixture was changed as shown in Table 5. The transparency of the polymerization mixture and that of the film sample were shown in Table 5.

11. Comparative Example B5 and B6

The same operations as in Example B1 were repeated except that the solvent of the polymerization mixture was changed as shown in Table 5. The transparency of the polymerization mixture and that of the film sample were shown in Table 5.

TABLE 5

|  |  | Transparency | | | |
|---|---|---|---|---|---|
|  |  | Diethylene glycol mono n-butyl ether | | Triethylene glycol mono n-butyl ether | |
|  | Prepolymer | Polymerization mixture | Film sample | Polymerization mixture | Film sample |
| Example B7 | Prepolymer B2 | Clear solution | transparent | Clear solution | transparent |
| Example B8 | Prepolymer B3 | Clear solution | transparent | Clear solution | transparent |
| Example B9 | Prepolymer B4 | Clear solution | transparent | Clear solution | transparent |
| Example B10 | Prepolymer B5 | Clear solution | transparent | Clear solution | transparent |
| Comparative Example B5 | Prepolymer B6 | Phase separation | Not transparent | Phase separation | not transparent |
| Comparative Example B6 | Prepolymer B7 | Phase separation | Not transparent | Phase separation | not transparent |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A composition comprising:
    a) from about 20% to about 95% content by weight of the composition of a silicone prepolymer having an average silicon content of from about 10% to about 20% by weight of the prepolymer, wherein the silicone prepolymer comprises:
    (1) at least one silicone-containing residue having a structure represented by the formula (a):

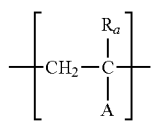

(a)

wherein $R_a$ represents hydrogen or methyl, and
wherein A represents a siloxanyl group; and (2) at least one polymerizable residue having a structure represented by the formula (p):

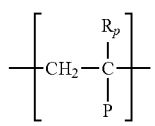

(p)

wherein $R_p$ represents hydrogen or methyl, and
wherein P represents an organic group comprising at least one polymerizable moiety;

wherein at least one of the at least one silicone-containing residue is a polar silicone-containing residue further comprising at least one polar moiety; and
wherein the prepolymer has a polar silicone-containing residue content of from about 30% to about 90% by weight of the prepolymer, and b) from about 5% to about 80% content by weight of the composition of a solvent having a structure represented by formula (1s):

$$R^{11}\text{—}O\text{-}G\text{-}R^{13}, \tag{1s}$$

wherein $R^{11}$ and $R^{13}$ independently represent hydrogen or an organic radical comprising from 1 to 20 carbon atoms; and
wherein G comprises:
(1) at least one group having a structure represented by formula (1s1):

wherein the total number of group(s) in G having a structure represented by formula (1s1) is defined as m, and
wherein m is an integer of from 1 to 50; and
(2) at least one group having a structure represented by formula (1s2):

wherein the total number of group(s) in G having a structure represented by formula (1s2) is defined as n, and
wherein n is an integer of from 1 to 50, and
wherein $R^{12}$ is a divalent organic radical comprising from 3 to 20 carbon atoms; and
wherein m/(m+n) is from about 0.05 to about 0.95.

2. The composition of claim 1, further comprising an initiator.

3. The composition of claim 1, wherein $R^{11}$ and $R^{13}$ independently represent hydrogen, a $C_1$-$C_{20}$ alkyl residue, or a $C_1$-$C_{20}$ aryl residue.

4. The composition of claim 1, wherein $R^{12}$ represents a $C_3$-$C_{20}$ alkylene residue or a $C_3$-$C_{20}$ arylene residue.

5. The composition of claim 1, wherein (the number of oxygen atom)/(the number of carbon atom) in the formula (1s) is not more than 0.37.

6. The composition of claim 1, wherein $R^{12}$ has a structure represented by formula (1s2-1):

wherein $R^{14}$ represents a $C_1$-$C_{18}$ alkyl residue or a $C_1$-$C_{18}$ aryl residue.

7. The composition of claim 1, wherein the number average molecular weight of the solvent is not more than 450.

8. The composition of claim 1, wherein one of $R^{11}$ and $R^{13}$ represents hydrogen and the other of $R^{11}$ and $R^{13}$ represents a $C_1$-$C_{10}$ alkyl residue or a $C_1$-$C_{10}$ aryl residue.

9. The composition of claim 1, wherein m/(m+n) is from about 0.2 to about 0.8.

10. The composition of claim 1, wherein ethylene oxide residue(s) and —$R^{12}$—O— group(s) in the solvent represented by the formula(s) are randomly copolymerized.

11. The composition of claim 1, wherein the silicone prepolymer further comprises at least one hydrophilic residue having a structure represented by the following formula (b):

wherein $R_b$ represents hydrogen or methyl; and
wherein B represents a hydrophilic group.

12. A method for producing a polymer comprising the step of polymerizing prepolymer from the composition of claim 1, thereby providing the polymer.

13. The polymer produced by the process of claim 12.

14. An ophthalmic lens comprising the polymer of claim 13.

15. A contact lens comprising the polymer of claim 13.

16. A composition comprising:
a) from about 20% to about 95% content by weight of the composition of a silicone prepolymer having an average silicon content of from about 10% to about 30% by weight of the prepolymer, wherein the silicone prepolymer comprises:
(1) at least one silicone-containing residue having a structure represented by the formula (a):

wherein $R_a$ represents hydrogen or methyl, and
wherein A represents a siloxanyl group; and
(2) at least one polymerizable residue having a structure represented by the formula (p):

wherein $R_p$ represents hydrogen or methyl, and
wherein P represents an organic group comprising at least one polymerizable moiety;
wherein at least one of the at least one silicone-containing residue is a polar silicone-containing residue further comprising at least one polar moiety; and
wherein the prepolymer has a polar silicone-containing residue content of from about 30% to about 90% by weight of the prepolymer, and b) from about 5% to about 80% content by weight of the composition of a solvent having a structure represented by formula (2s):

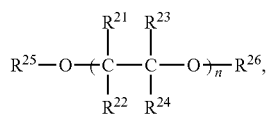
(2s)

wherein $R^{21}$ to $R^{24}$ independently represent hydrogen or an organic radical comprising from 1 to 20 carbon atoms;
wherein $R^{25}$ and $R^{26}$ independently represent hydrogen or an organic radical comprising from 1 to 20 carbon atoms;
wherein n represent integers of from 1 to 50;
wherein the total number of carbon atom in $R^{25}$ and $R^{26}$ is defined as r; and
wherein $(n+1)/(2n+r)$ is not more than about 0.45.

17. The composition of claim 16, further comprising an initiator.

18. The composition of claim 16, wherein $R^{11}$ and $R^{13}$ independently represent hydrogen, a $C_1$-$C_{20}$ alkyl residue, or a $C_1$-$C_{20}$ aryl residue.

19. The composition of claim 16, wherein $R^{12}$ represents a $C_3$-$C_{20}$ alkylene residue or a $C_3$-$C_{20}$ arylene residue.

20. The composition of claim 16, wherein (the number of oxygen atom)/(the number of carbon atom) in the formula (1s) is not more than 0.37.

21. The composition of claim 16, wherein $R^{12}$ has a structure represented by formula (1s2-1):

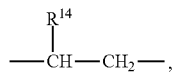
(1s2-1)

wherein $R^{14}$ represents a $C_1$-$C_{18}$ alkyl residue or a $C_1$-$C_{18}$ aryl residue.

22. The composition of claim 16, wherein the number average molecular weight of the solvent is not more than 450.

23. The composition of claim 16, wherein one of $R^{11}$ and $R^{13}$ represents hydrogen and the other of $R^{11}$ and $R^{13}$ represents a $C_1$-$C_{10}$ alkyl residue or a $C_1$-$C_{10}$ aryl residue.

24. The composition of claim 16, wherein $m/(m+n)$ is from about 0.2 to about 0.8.

25. The composition of claim 16, wherein ethylene oxide residue(s) and —$R^{12}$—O— group(s) in the solvent represented by the formula (s) are randomly copolymerized.

26. The composition of claim 16, wherein the silicone prepolymer further comprises at least one hydrophilic residue having a structure represented by the following formula (b):

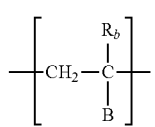
(b)

wherein $R_b$ represents hydrogen or methyl; and
wherein B represents a hydrophilic group.

27. A method for producing a polymer comprising the step of polymerizing prepolymer from the composition of claim 16, thereby providing the polymer.

28. The polymer produced by the process of claim 27.

29. An ophthalmic lens comprising the polymer of claim 28.

30. A contact lens comprising the polymer of claim 28.

* * * * *